United States Patent
Wang et al.

(10) Patent No.: US 12,520,130 B2
(45) Date of Patent: Jan. 6, 2026

(54) NODES IN COMMUNICATION NETWORK AND METHODS THEREOF

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 18/018,739

(22) PCT Filed: Jul. 7, 2021

(86) PCT No.: PCT/KR2021/008653
§ 371 (c)(1),
(2) Date: Jan. 30, 2023

(87) PCT Pub. No.: WO2022/030770
PCT Pub. Date: Feb. 10, 2022

(65) Prior Publication Data
US 2023/0319544 A1 Oct. 5, 2023

(30) Foreign Application Priority Data
Aug. 4, 2020 (CN) .................. 202010772746.X

(51) Int. Cl.
*H04L 12/00* (2006.01)
*H04L 61/5007* (2022.01)
(Continued)

(52) U.S. Cl.
CPC .......... *H04W 8/26* (2013.01); *H04L 61/5007* (2022.05); *H04W 36/0019* (2023.05);
(Continued)

(58) Field of Classification Search
CPC .............. H04W 8/26; H04W 36/0019; H04W 36/0064; H04W 36/185; H04W 88/06;
(Continued)

(56) References Cited

U.S. PATENT DOCUMENTS 11,528,654 B2 * 12/2022 Akl ........................ H04W 40/02
11,564,153 B2 * 1/2023 Wang ..................... H04L 5/0035
(Continued)

FOREIGN PATENT DOCUMENTS

CN 110536350 A 12/2019
WO 2020/001146 A1 1/2020
(Continued)

OTHER PUBLICATIONS

Samsung, Summary of offline discussion on CB: # 44_Email044-IAB_IPaddr_mgmt, R3-201143, 3GPP TSG-RAN WG3 #107-e, Mar. 8, 2020, XP051861474.
(Continued)

*Primary Examiner* — Frantz Coby
(74) *Attorney, Agent, or Firm* — Jefferson IP Law, LLP

(57) ABSTRACT

The present disclosure provides a source integrated access and backhaul (IAB)-central unit (CU) in a communication system and a method thereof. The method may comprise: sending, to a target IAB-CU, a request message including information for requesting to configure a relay node to migrate; and receiving, from the target IAB-CU, a response message including information for configuring the relay node to migrate.

20 Claims, 14 Drawing Sheets

(51) Int. Cl.
   *H04W 8/26*     (2009.01)
   *H04W 36/00*    (2009.01)
   *H04L 101/659*  (2022.01)
   *H04W 36/18*    (2009.01)

(52) U.S. Cl.
   CPC ... *H04W 36/0064* (2023.05); *H04L 2101/659* (2022.05); *H04W 36/185* (2023.05)

(58) Field of Classification Search
   CPC ........... H04W 36/0033; H04L 61/5007; H04L 2101/659
   USPC ........................................................ 370/329
   See application file for complete search history.

(56) References Cited

U.S. PATENT DOCUMENTS

| | | | | |
|---|---|---|---|---|
| 11,659,482 | B2* | 5/2023 | Dey | H04W 40/16 370/329 |
| 11,706,690 | B2* | 7/2023 | Akl | H04W 36/38 370/331 |
| 11,950,149 | B2* | 4/2024 | Akl | H04W 36/0077 |
| 2014/0211756 | A1 | 7/2014 | Bontu et al. | |
| 2017/0295546 | A1 | 10/2017 | Young et al. | |
| 2020/0196225 | A1 | 6/2020 | Wang et al. | |
| 2021/0250817 | A1 | 8/2021 | Zou et al. | |
| 2021/0345197 | A1* | 11/2021 | Akl | H04W 36/0033 |
| 2021/0392565 | A1* | 12/2021 | Akl | H04L 45/24 |
| 2021/0410058 | A1* | 12/2021 | Dey | H04W 40/24 |
| 2022/0015010 | A1* | 1/2022 | Akl | H04W 36/0064 |
| 2022/0141749 | A1 | 5/2022 | Luo et al. | |
| 2023/0164658 | A1* | 5/2023 | Ishii | H04W 36/0055 370/331 |
| 2023/0239755 | A1* | 7/2023 | Teyeb | H04W 40/24 370/331 |

FOREIGN PATENT DOCUMENTS

WO    2020/039346 A1    2/2020
WO    2020/090987 A1    5/2020

OTHER PUBLICATIONS

Extended European Search Report dated Jan. 12, 2024, issued in European Patent Application No. 21853986.4.
3GPP TS 38.401 V16.2.0; 3rd Generation Partnership Project; Technical Specification Group Radio Access Network; NG-RAN; Architecture description (Release 16), Jul. 17, 2020.
3GPP TS 38.423 V16.2.0; 3rd Generation Partnership Project; Technical Specification Group Radio Access Network; NG-RAN; Xn application protocol (XnAP) (Release 16), Jul. 17, 2020.
Huawei, HiSilicon; Solution for Key Issue #3: Service continuity via UE-to-Network Relay; SA WG2 Meeting #136AH; S2-2000492; (revision of S2-1911554), Jan. 7, 2020, Incheon, South Korea.
Wei Tang et al., PMIPv6 Based Fast Handover Scheme for Network Mobility, Computer Science, vol. 40, No. 11, Nov. 15, 2013.
Chinese Office Action dated Sep. 14, 2024, issued in Chinese Patent Application No. 202010772746.X.
Samsung, Nokia, Nokia Shanghai Bell, Huawei, ZTE, R3-204519; 3GPP TSG-RAN WG3 #108-e; BL CR to 36.423: Support for IAB, Jun. 24, 2020.
ZTE, TS38.423 pCR on Configuring Index to RFSP info During Xn Mobility, R3-183541; 3GPP TSG RAN, WG3#100; TS38.423 pCR on, Configuring Index to RFSP info, During Xn Mobility, May 28, 2018.
Samsung, (TP for NR_IAB BL CR for TS36.423) IAB node indication for X2 handover, R3-194985; 3GPP TSG-RAN; WG3 Meeting #105bis; (TP for NR_IAB BL CR for TS36.423); IAB node indication for X2 handover; Oct. 4, 2019.
Chinese Office Action dated Mar. 5, 2025, issued in Chinese Application No. 202010772746.

* cited by examiner

EMBODIMENT 1-2

NODES IN COMMUNICATION NETWORK AND METHODS THEREOF

CROSS-REFERENCE TO RELATED APPLICATION(S)

This application is a U.S. National Stage application under 35 U.S.C. § 371 of an International application number PCT/KR2021/008653, filed on Jul. 7, 2021, which is based on and claimed priority of a Chinese patent application number 202010772746.X, filed on Aug. 4, 2020, in the Chinese Intellectual Property Office, the disclosure of which is incorporated by reference herein in its entirety.

TECHNICAL FIELD

The present disclosure relates to a communication system, and in particular, to devices and methods for interacting user-related context between central units and distributed units of base stations.

BACKGROUND ART

In an NR (new radio) access network, in order to expand coverage of the network, a relay network's architecture, that is, IAB (integrated access and backhaul), is proposed.

In order to realize the transmission of user data in a multi-hop relay network, 3GPP has defined a new protocol layer, that is, a BAP (backhaul adaptation protocol) layer. The protocol layer will be configured in a distributed unit of a donor (anchor) node and a relay node (such as a mobile terminal portion of the relay node and/or a distributed unit portion of the relay node) and is located above the RLC (radio link control) layer, and its main function is routing of data packets and mapping of data packets. In order to send user data between the relay node and the donor (anchor) node, it is necessary to complete the configuration of backhaul links and the configuration of the F1 interface between the distributed unit portion of the relay node and the donor (anchor) node. These configurations include but are not limited to the following types: for example, BAP addresses, routing configurations (for example, routing identification information, which indicates different transmission routes and includes therein BAP addresses and path identifications of destination reception nodes), backhaul link channel configuration, tunnel configuration, backhaul link configuration for tunnel, etc.

The above information is provided only as background information to help understanding of the present disclosure. Regarding the present disclosure, no decision has been made and no statement has been made as to whether any of the above may be applicable to the prior art.

DISCLOSURE OF INVENTION

Technical Problem

The current research assumes that when an upper-level node of a relay node changes, the relay node needs to migrate. In this procedure, in addition to completing the handover of the mobile terminal portion of the relay node, completing the migration of the users served by the distributed unit portion of the relay node is also needed. In this procedure, a large number of signaling interactions (signaling storms) are involved in a short time, and only after these signaling interactions are completed, user data can be transmitted. Therefore, this procedure leads to problems of excessive signaling overhead, interruption of user data transmission or large time delay.

Solution to Problem

The solution of the traditional technology is that in the migration procedure of the relay node, the signaling overhead is large, the transmission of the user data is interrupted, or the time delay is large.

According to an aspect of the present disclosure, there is provided a method executed by a first node in a communication system, comprising: receiving a first message from a fourth node, the first message including information for configuring the first node to perform migration; and performing data transmission according to the received first message.

According to another aspect of the present disclosure, there is provided a method executed by a fourth node in a communication system, comprising: acquiring information for configuring a first node to perform migration; and sending a first message to the first node, the first message including the information for configuring the first node to perform migration.

In the method according to the embodiment of the present disclosure, the first message may include at least one of the following information: information related to a backhaul link, information related to an address, and information related to configuration keep.

In the method according to the embodiment of the present disclosure, the information related to a backhaul link may include at least one of the following information: address information used when serving the backhaul link and configuration information of a default backhaul link.

In the method according to the embodiment of the present disclosure, the configuration information of a default backhaul link may include at least one of the following information: default routing identification information used for transmitting uplink data, identification information of a default backhaul link channel used for transmitting data, identification information of a default backhaul link channel used for transmitting uplink data, identification information of a default backhaul link channel used for receiving downlink data, and indication information of a type of transmitted data.

In the method according to the embodiment of the present disclosure, the address-related information may include at least one of the following information: index information of an address, Internet IP address information, usage information of the IP address, and address information of a distributed unit of a donor (anchor) node corresponding to the IP address.

In the method according to the embodiment of the present disclosure, the information related to configuration keep may include at least one of the following information: indication information for keeping configuration, indication information for keeping backhaul link channel, indication information for keeping configuration of a mobile terminal portion of the first node, indication information for keeping configuration of a distributed unit portion of the first node, information of configuration that the first node needs to keep, information related to a type of data kept, indication information for keeping a source path, and information of length of time to keep configuration.

In the method according to the embodiment of the present disclosure, the information of configuration that the first node needs to keep may include at least one of the following information: configuration of BAP, a BAP address, default routing identification information, identification information of a default backhaul link channel, identification information of a backhaul link channel, configuration information of a tunnel, configuration information of a transport layer association, configuration information of an address, configuration of a transmission route, and indication information for keeping one or more of the above-mentioned configurations.

In the method according to the embodiment of the present disclosure, the information related to a type of data kept may include at least one of the following information: all data, control plane data of an F1 interface, user plane data of the F1 interface, data of non-F1 interface, control plane data of the F1 interface associated with a user, control plane data of the F1 interface associated with non-user, control data of a BAP layer, uplink data, downlink data, and indication information for keeping.

The method of the fourth node according to the embodiment of the present disclosure may further comprise: sending a third message to a fifth node. The third message may include at least one of the following information: identification information of the first node and the address-related information.

In the method according to the embodiment of the present disclosure, the address-related information may include at least one of the following information: address index information, address information, address information for control plane data of the F1 interface F1-C traffic, address information for user plane data of the F1 interface F1-U traffic, address information for data of the non-F1 interface non-F1 traffic, and indication information of usage of an address.

According to another aspect of the present disclosure, there is provided a method executed by a second node in a communication system, comprising: sending a second message to a third node, the second message includes requesting information for configuring a first node to migrate; and receiving a second response message from the third node, the second response message including information for configuring the first node to migrate.

According to another aspect of the present disclosure, there is provided a method executed by a third node in a communication system, comprising: receiving a second message from a second node, the second message includes requesting information for configuring a first node to migrate; and sending a second response message to the second node, the second response message including the information for configuring the first node to migrate.

In the method according to the embodiment of the present disclosure, the second message may include at least one of the following information: configuration information of the first node, request information related to an address of the first node, information related to a backhaul link of the first node, indication information for requesting to keep configuration, and information related to a load of the first node.

In the method according to the embodiment of the present disclosure, the request information related to an address of the first node may include at least one of the following information: address request information, indication information of an address request, and address information used on a source path.

In the method according to the embodiment of the present disclosure, the information related to a backhaul link of the first node may include at least one of the following information: information related to a backhaul link channel and indication information of a request for keeping all backhaul link channels.

In the method according to the embodiment of the present disclosure, the indication information for requesting to keep configuration may include at least one of the following information: indication information for requesting to reserve configuration on a source path, indication information for requesting to keep backhaul link channel, indication information for requesting to keep configuration of a mobile terminal portion of the first node, indication information for requesting to keep configuration of a distributed unit portion of the first node, and indication information of configuration requested to be kept.

In the method according to the embodiment of the present disclosure, the information related to a load of the first node may include at least one of the following information: information of the number of users accessing the first node, information of the number of bearers served by the first node, information related to a backhaul link channel configured by the mobile terminal portion of the first node, indication information of a hardware load, indication information of capacity of a transmission network layer, and information of a cell load of the first node.

In the method according to the embodiment of the present disclosure, the second response message may include at least one of the following information: feedback information related to an address of the first node, response information for keeping configuration, configuration information related to a backhaul link of the first node, information related to initiating user context migration, and indication information for accepting user migration.

In the method according to the embodiment of the present disclosure, the feedback information related to an address of the first node may include at least one of the following information: information of an address configured by the first node and setting value information of an IP packet.

In the method according to the embodiment of the present disclosure, the response information for keeping configuration may include at least one of the following information: indication information for agreeing to the request and reserved configuration information.

In the method according to the embodiment of the present disclosure, the information related to initiating user context migration may include at least one of the following information: indication information for initiating user context migration, identification information of a relay node accessed by a user, and information of the number of users allowed to be accepted, information of the number of radio bearers of users allowed to be accepted, and clock information for initiating migration.

In the method according to the embodiment of the present disclosure, the indication information for accepting user migration may include at least one of the following information: indication information for stopping user context migration, information of the number of users that can further be accepted, and reason information.

According to another aspect of the present disclosure, there is provided a method executed by a second node in a communication system, comprising: sending a fourth message to a third node, the fourth message including user configuration information; and receiving a fourth response message from the third node.

According to another aspect of the present disclosure, there is provided a method executed by a third node in a communication system, comprising: receiving a fourth message from a second node, the fourth message including user configuration information; and sending a fourth response message to the second node.

In the method according to the embodiment of the present disclosure, the fourth message may include at least one of the following information: first information related to configuration of a user, indication information of usage of the message, and information related to migration.

In the method according to the embodiment of the present disclosure, the first information related to configuration of a user may include at least one of the following information: first identification information of a cell and first configuration information related to user data.

In the method according to the embodiment of the present disclosure, the indication information of usage of the message may include at least one of the following information: indication information of user context migration, indication information of non-handover, indication information for ignoring information, and reason information.

In the method according to the embodiment of the present disclosure, the information related to migration may include at least one of the following information: indication information of end of migration and indication information of the number of users that have not yet been migrated.

In the method according to the embodiment of the present disclosure, the fourth response message may include at least one of the following information: second information related to configuration of a user, indication information of user migration, and indication information for ignoring information.

In the method according to the embodiment of the present disclosure, the second information related to configuration of a user may include at least one of the following information: second identification information of a cell and indication information for reserving configuration information of a radio bearer of a user.

In the method according to the embodiment of the present disclosure, the indication information of user migration may include at least one of the following information: indication information for stopping user context migration, information of the number of users that can further be accepted, and reason information.

The method for the third node according to the embodiment of the present disclosure may further comprise: sending a fifth message to the second node. The fifth message may include at least one of the following information: indication information for initiating user context migration, identification information of a relay node accessed by a user, information of the number of users allowed to be accepted, information of the number of radio bearers of users allowed to be accepted, clock information for initiating migration, and indication information of user migration.

In the method according to the embodiment of the present disclosure, the indication information of user migration may include at least one of the following information: indication information for stopping user context migration, information of the number of users that can further be accepted, and reason information.

The method for the second node according to the embodiment of the present disclosure may further comprise: sending a sixth message to the third node, the sixth message may include at least one of the following information: indication information of completion of user context migration and second configuration information related to user data.

In the method according to the embodiment of the present disclosure, the second configuration information related to user data may include at least one of the following information: identification information of a radio bearer, transmission status information of uplink data, and transmission status information of downlink data.

The method for the third node according to the embodiment of the present disclosure may further comprise: sending a seventh message to the second node. The seventh message may include at least one of the following information: identification information of a relay node, indication information for releasing user context, indication information for releasing context of the relay node, and indication information for releasing configuration of a source path.

The method for the second node or the third node according to the embodiment of the present disclosure may further comprise: sending an eighth message to a first node, the eighth message includes at least one of the following information: identification information of a relay node, indication information for releasing user context, indication information for releasing context of the relay node, and indication information for releasing configuration of a source path.

According to a further aspect of the present disclosure, there is also provided a node for executing one of the above methods, comprising a donor (anchor) node, a distributed unit of the donor (anchor) node, a relay node and so on.

BRIEF DESCRIPTION OF DRAWINGS

The above and other aspects, features and advantages of certain embodiments of the present disclosure will become apparent from the following description in conjunction with the accompanying drawings, in which.

MODE FOR THE INVENTION

Figure 1:
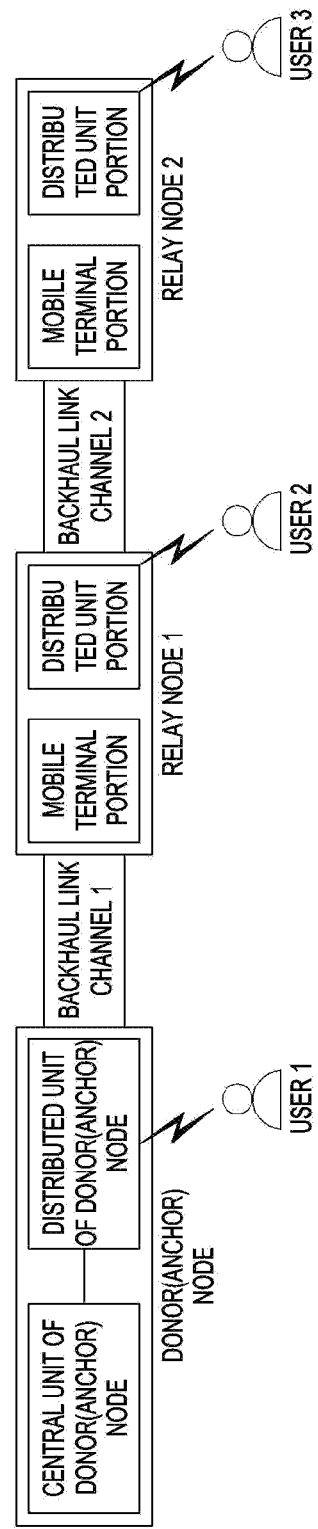
FIG. 1 is the schematic architecture of a multi-hop relay network (an IAB network).

The following description with reference to the accompanying drawings is provided to help a comprehensive understanding of various embodiments of the present disclosure defined by claims and their equivalents. It includes various specific details to help such understanding, but these details will be regarded as merely exemplary. Therefore, those of ordinary skill in the art will recognize that various changes and modifications can be made to the various embodiments described herein without departing from the scope and spirit of the present disclosure. In addition, for clarity and conciseness, descriptions of well-known functions and constructions may be omitted.

The terms and words used in the following description and claims are not limited to the bibliography meanings, but are only used by the inventor to enable a clear and consistent understanding of the present disclosure. Therefore, those skilled in the art should understand that the following description of various embodiments of the present disclosure is provided for the illustrative purpose only, and not for the purpose of limiting the present disclosure defined by the appended claims and their equivalents.

It is to be understood that, unless the context clearly dictates otherwise, singular forms "a", "an" and "the" include plural referents.

In addition, the detailed description of the embodiments of the present disclosure is mainly based on a wireless communication system of a multi-hop relay network. However, without departing from the scope of the present disclosure, the subject of the present disclosure, with slight modifications, can be applied to other communication systems with similar technical backgrounds and channel forms, and can be determined by those skilled in the art.

By referring to the various embodiments described in detail below in conjunction with the accompanying drawings, the advantages and features of the present disclosure and the manner of implementing them will become apparent. However, the present disclosure is not limited to the embodiments set forth below, but can be implemented in various different forms. The following embodiments are provided only to fully disclose the present disclosure and to notify those skilled in the art of the scope of the present disclosure, and the present disclosure is only defined by the scope of the appended claims. Throughout the specification, the same or similar reference numerals designate the same or similar elements.

Here, it will be understood that each step in the flowchart description and a combination of steps in the flowchart description can be implemented by computer program instructions. These computer program instructions can be provided to processors of a general-purpose computer, a special-purpose computer, or other programmable data processing apparatuses to produce a machine, so that the instructions executed by the processors of the computers or other programmable data processing apparatuses create means for implementing the functions specified in the flowchart. These computer program instructions can also be stored in a computer-usable or computer-readable memory, which can instruct a computer or other programmable data processing apparatus to work in a specific manner, so that the instructions stored in the computer-usable or computer-readable memory produce an artifact including the instruction means implementing the functions specified in the flowchart. Computer program instructions can also be loaded on a computer or other programmable data processing apparatuses, so that a series of operations performed on the computer or other programmable apparatuses produce a computer-implemented procedure, making the instructions executed on the computer or other programmable apparatuses provide operations for implementing the functions specified in the flowchart.

Furthermore, each block in the flowchart description may represent a module, a segment or a part of codes, which includes one or more executable instructions for implementing the specified logical function(s). It should also be noted that in some alternative implementations, the functions or steps marked in the flowchart may occur out of order. For example, depending on the functions involved, two steps shown in succession may actually be performed substantially simultaneously, or sometimes the steps may be performed in the reverse order. In some cases, multitasking and parallel execution may be advantageous.

As used herein, a "unit" or "module" refers to a software element or hardware element that performs a predetermined function, such as a field programmable gate array (FPGA) or an application specific integrated circuit (ASIC). However, "unit" or "module" does not always have a meaning limited to software or hardware. The "unit" or "module" may be constructed to be stored in an addressable storage medium or execute one or more processors. Therefore, a "unit" or "module" includes, for example, software elements, object-oriented software elements, class elements or task elements, processes, functions, attributes, procedures, subroutines, segments of program codes, drivers, firmware, microcode, circuits, data, databases, data structures, tables, arrays and parameters. The elements and functions provided by the "unit" or "module" can be combined into a smaller number of element "units" or "modules", or divided into a larger number of element "units" or "modules". In addition, the element "unit" or "module" can be implemented to reproduce one or more central processing units (CPUs) in a device or a secure multimedia card.

The various aspects of the present disclosure as generally described herein and shown in the drawings can be arranged, substituted, combined, separated and designed in various different configurations, all of which can be considered herein. In addition, unless the context dictates otherwise, the features shown in each drawing may be used in combination with each other. Therefore, the drawings should generally be regarded as constituent parts of one or more general embodiments, and it should be understood that not all the illustrated features are necessary for each embodiment.

It will be understood that although the words "first", "second", etc. may be used herein to describe different elements, components and/or parts, these elements, components and/or parts should not be limited by these words. These words are only used to distinguish one element, component and/or part from another element, component and/or part. Therefore, a first element, a first component and/or a first part discussed below may also be referred to as a second element, a second component and/or a second part without departing from the teaching of the present disclosure.

The terms used herein are only for describing specific embodiments, and are not intended to limit the present disclosure. It will also be understood that when the words "include" and/or "comprise" are used in this specification, it indicates that the described features, integrals, steps, operations, elements and/or components are present, but it does not exclude the presence or addition of one or more other features, integrals, steps, operations, elements and/or components and any combinations thereof.

Unless otherwise defined, all terms (including technical and scientific terms) used herein have the same meanings as those commonly understood by those of ordinary skills in the art to which the present disclosure belongs. It will also be understood that those terms as defined in commonly used dictionaries should be interpreted as having meanings consistent with their meanings in the context of the related field, and should not be interpreted ideally or too formally, unless clearly defined as such herein.

A. COMPOSITION OF THE DISCLOSURE

The present disclosure includes two aspects:
Migration of a relay node
Migration of user configuration information (or context information)

B. EMBODIMENTS OF THE DISCLOSURE

The message names in the present disclosure are only examples, and other message names can also be used.

The "first", "second", etc. contained in the message names of the present disclosure are just examples of the messages, and do not represent the order of execution.

In the present disclosure, detailed descriptions of steps irrelevant to the present disclosure are omitted.

In the present disclosure, a mobile terminal function of a relay node is equivalent to a mobile terminal portion of the relay node, and a distributed unit function of the relay node is equivalent to a distributed unit portion of the relay node.

In the present disclosure, types of data transmitted by the relay node on a backhaul link include: F1 interface control plane data (F1AP message, or F1-C Traffic), F1 interface user-associated control plane data (UE-associated F1AP message, or UE-associated F1-C traffic), F1 interface non-user-associated control plane data (non-UE-associated F1AP message, or non-UE-associated F1-C traffic), F1 interface user plane data (F1-U traffic), non-F1 interface data (non-F1 traffic), BAP layer control data (BAP Control Protocol Data Unit, such as BAP layer flow-control-related data, BAP layer wireless-link-failure-related data, etc.), non-user-plane data (non-UP traffic, such as F1-C traffic, non-F1 traffic, BAP Control PDU, etc.).

The nodes involved in the present disclosure are as follows:
A first node: a relay node, or the relay node's distributed unit function, or the relay node's mobile terminal function
A second node: a source node, which can be a base station, a central unit of the base station, or a control plane portion of the central unit of the base station, or a user plane portion of the central unit of the base station, or a donor (anchor) node, or a central unit of the donor (anchor) node, or a control plane portion of the central unit of the donor (anchor) node, or a user plane portion of the central unit of the donor (anchor) node
A third node: a target node, which can be a base station, a central unit of the base station, or a control plane portion of the central unit of the base station, or a user plane portion of the central unit of the base station, or a donor (anchor) node, or a central unit of the donor (anchor) node, or a control plane portion of the central unit of the donor (anchor) node, or a user plane portion of the central unit of the donor (anchor) node.

The foregoing second node and third node may be the same node or different nodes.
A fourth node: a node to which the relay node is connected, such as a base station, a central unit of the base station, or a control plane portion of the central unit of the base station, or a user plane portion of the central unit of the base station, or a donor (anchor) node, or a central unit of the donor (anchor) node, or a control plane portion of the central unit of the donor (anchor) node, or a user plane portion of the central unit of the donor (anchor) node. In one embodiment, the node may be the above-mentioned second node, and in another embodiment, the node may be the above-mentioned third node
A fifth node: a distributed unit of a base station, or a distributed unit of a donor (anchor) node What considered in the present disclosure is migration of the relay node, which can also be considered as handover of the relay node. In the procedure of migration, the upper-level node (a parent node) to which the relay node is connected has changed. The upper-level node may be another relay node, or the distributed unit of the donor (anchor) node.

The purpose of the present disclosure is to enable, through the signaling interaction among the source donor (anchor) node, the target donor (anchor) node and the relay node, the relay node to keep the configuration on the source path or to configure backhaul link channels on the target path in the procedure of migration, to keep the continuity of user data transmission.

By migrating the user context between the source donor (anchor) node and the target donor (anchor) node, the occurrence of signaling storm is avoided and the signaling overhead in the user migration procedure is reduced.

FIG. 1 shows the schematic architecture of a multi-hop relay network (IAB network). The figure gives a network architecture containing one donor (anchor) node (such as IAB donor/donor (anchor)) and two relay nodes (such as IAB nodes). Users in the multi-hop network can access the network through the donor (anchor) node, or a distributed unit of the donor (anchor) node, or the relay nodes. For example, users 1/2/3 access the relay network through the distributed unit of the donor (anchor) node, a distributed unit portion of a relay node 1, and a distributed unit portion of a relay node 2, respectively. The donor (anchor) node can be an independent base station, or can be a base station composed of a central unit CU (in one embodiment, it can be the central unit of an IAB donor (anchor) node, i.e. an IAB-donor central unit) and a distributed unit DU (in one embodiment, it can be the distributed unit of the IAB donor (anchor) node, i.e. an IAB-donor distributed unit). The relay node includes a Mobile terminal function and a Distributed unit function (in another example, it can also be described as that the relay node includes a mobile terminal portion and a distributed unit portion). Wherein the mobile terminal function is used for communicating with the upper-level node of the relay node (for example, the mobile terminal portion of the relay node 1 is used to communicate with the donor (anchor) node or the distributed unit of the donor (anchor) node, and the mobile terminal portion of the relay node 2 is used to communicate with the distributed unit portion of the relay node 1). The distributed unit portion is used to communicate with the lower-level node of the relay node (for example, the distributed unit portion of the relay node 1 is used to communicate with the user 2, and can also be used to communicate with the mobile terminal portion of the relay node 2). The mobile terminal portion of the relay node can be regarded as a user accessing the network, so it has the function of a normal user (a non-relay node) (for example, the mobile terminal portion can establish a SRB (a signaling radio bearer) with the upper-level node thereof to send radio resource control (RRC) messages, and can also establish a data radio bearer (DRB) to send data). The central unit of the donor (anchor) node includes the following protocol stacks: protocol stacks serving the control plane, including a RRC protocol layer and a packet data convergence protocol (PDCP) layer; protocol stacks serving the user plane, including a service data adaptation protocol (SDAP) layer and the PDCP layer. The distributed unit of the donor (anchor) node or the distributed unit portion of the relay node includes the following protocol stacks: protocol stacks serving the control plane and the user plane, including a radio link control (RLC) protocol layer, a medium access control (MAC) protocol layer and a physical layer (PHY). The interfaces between the central unit of the donor (anchor) node and the distributed unit of the donor (anchor) node, and between the central unit of the donor (anchor) node and the distributed unit portion of the relay node are F1 interfaces (see 3GPP TS38.473).

In the relay network, the links between the relay node and the donor (anchor) node or the distributed unit of the donor (anchor) node, or between the relay nodes are backhaul links on which there will be established one or more different backhaul link channels, such as a backhaul link channel 1 and a backhaul link channel 2 in FIG. 1, in which the backhaul link channel 1 is located between the donor (anchor) node and the relay node 1, and the backhaul link channel 2 is located between the relay node 1 and the relay node 2. An example of the backhaul link channel is the backhaul link RLC protocol layer channel, i.e. the backhaul link RLC protocol layer channel. In the relay network, each backhaul link channel is used to send data packets belonging to the same user or different users. The data packet can be a data packet of a user data radio bearer (DRB), a data packet of a user SRB, a data packet of the control plane on the F1 interface, a data packet of the user plane on the F1 interface, a data packet of the non-F1 interface (such as an internet protocol security (IPSec) data packet, a data packet of stream control transmission protocol (SCTP), a data packet of operation administration and maintenance (OAM), etc.).

Figure 2:
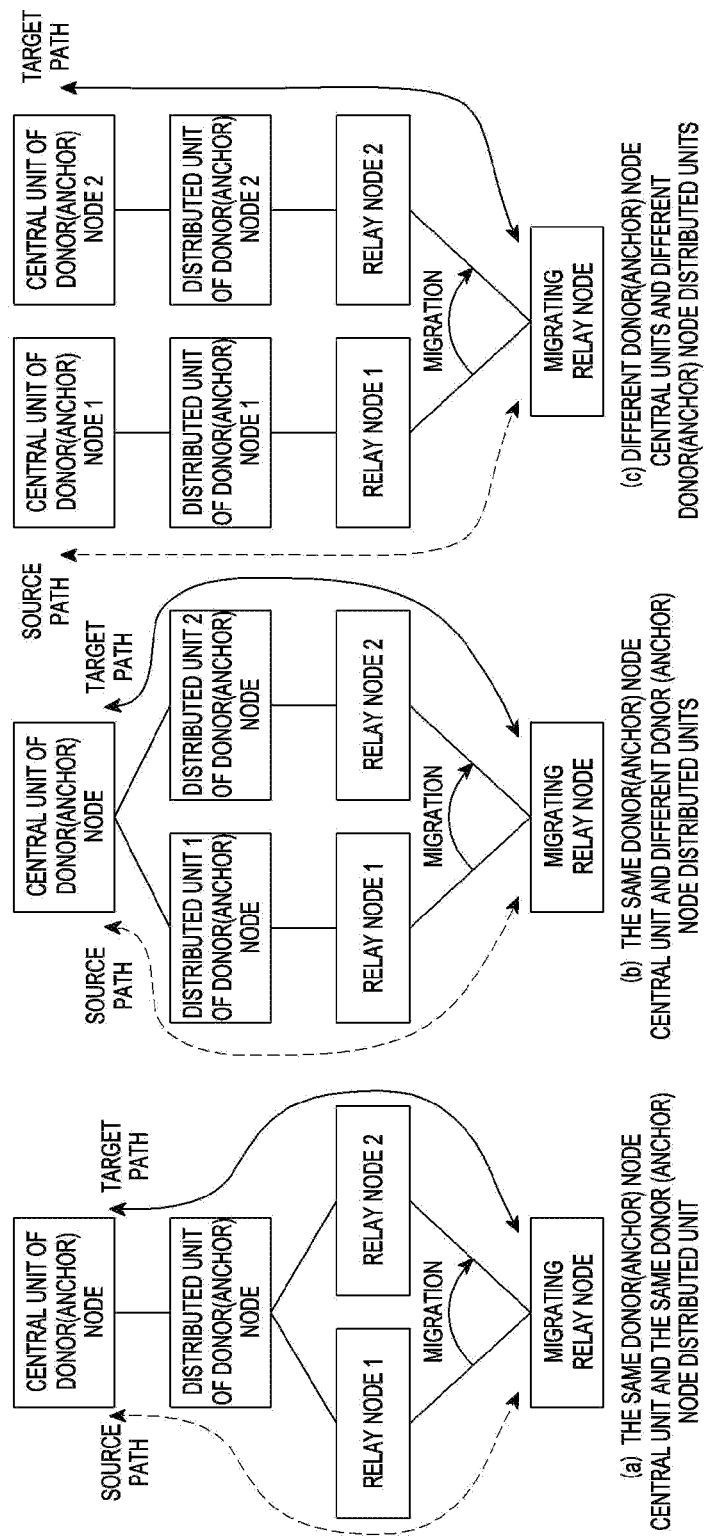
FIG. 2 shows examples of several scenarios of relay node migration according to an embodiment of the present disclosure.

FIG. 2 shows examples of several scenarios of relay node migration according to embodiments of the present disclosure:
1) Intra-CU/intra-DU (the same donor (anchor) node central unit and the same donor (anchor) node distributed unit): in the procedure of migration, neither the central unit of the donor (anchor) node nor the distributed unit of the donor (anchor) node serving the relay node has changed
2) Intra-CU/inter-DU (the same donor (anchor) node central unit and different donor (anchor) node distributed units): in the procedure of migration, the central unit of the donor (anchor) node serving the relay node has not changed, but the distributed unit of the donor (anchor) node has changed
3) Inter-CU/inter-DU (different donor (anchor) node central units and different donor (anchor) node distributed units): in the procedure of migration, both the central unit of the donor (anchor) node and the distributed unit of the donor (anchor) node serving the relay node have changed In the present disclosure, the path connected (used) by the relay node before migration is the source path, and the path connected (used) by it after migration is the target path.

The key information involved in the present disclosure is as follows:
Configuration information of user (or user context information). The user is a user accessing the network. In one embodiment, the user is any user accessing the network. In one embodiment, the user is a user who accesses the network through a relay node. In one embodiment, the user is a user who keeps the connection with the relay node in the relay node migrate procedure. In one embodiment, the user may be a relay node, or a mobile terminal portion of the relay node. The content contained in this information can refer to the information contained in the HANDOVER REQUEST and HANDOVER REQUEST ACKNOWLEDGE messages in TS38.423/TS36.423. In addition, it can also include at least one of the following information:
  Identification information of the user on the F1 interface (such as a gNB-CU UE F1AP ID, a gNB-DU UE F1AP ID), which can be the identification information used by the distributed unit portion of the relay node to which the user is connected and the central unit of the donor (anchor) node when configuring the user. In one embodiment, the central unit of the donor (anchor) node may be the central unit to which the relay node is connected before migration
  Configuration information of a radio bearer (such as a DRB) of a user, which may include configurations of one or more radio bearers. For one radio bearer, the information includes at least one of the following information:
  Information related to quality of service (QoS) satisfied by the relay node, which is used to indicate the information related to QoS of the radio bearer that has been satisfied by the relay node when serving the radio bearer. In one the relay node is a relay node accessed by the user. Further, the relay node may have migrated, and the user still accesses the network through the relay node after the migration. The information includes at least one of the following information: a non-dynamic 5QI descriptor, a dynamic 5QI descriptor, Allocation and reservation priority, GBR QoS Flow Information, etc. Specific information can be referred to in 3GPP TS38.473

It should be noted that the above-mentioned "information related to QoS satisfied by the relay node" is different from the information related to QoS of each radio bearer in the traditional technology (referred to as "QoS information of the radio bearer" in the present disclosure, and parameters contained in the information can be referred to in 3GPP TS38.473). The "QoS information of the radio bearer" indicates the QoS requirements of the radio bearer, and a node receiving the information needs to configure the resources serving the radio bearer in accordance with the content contained in the information, so as to satisfy the QoS requirements of the radio bearer. The above-mentioned "information related to QoS satisfied by the relay node" indicates the QoS requirements that have been satisfied by the relay node, and a node receiving the information will determine the QoS requirements that it still needs to satisfy (in the present disclosure, it is called remaining QoS requirements) according to the information, so as to configure the resources serving the radio bearer to satisfy the "remaining QoS requirements". A beneficial effect of this information is that the node receiving the information can learn the QoS that the relay node can satisfy when serving the user's radio bearer, and determine how to configure other nodes to serve the user's radio bearer, so that the relay node and other nodes jointly serve the user's radio bearer and satisfy the QoS requirements of the radio bearer. Another beneficial effect of this information is that the node receiving the information can try to configure the relay node to serve the user's radio bearer in accordance with the QoS indicated by the information, so that there is no need to modify the configuration information of the relay node when serving the user's radio bearer.

Information related to a tunnel of uplink data. The uplink data is the data sent by the relay node to the donor (anchor) node. The tunnel may refer to one or more tunnels. The information indicates the information of a donor (anchor) node, or a central unit of the donor (anchor) node or a user plane portion of the central unit of the donor (anchor) node. When the relay node migrates, the tunnel may be the uplink tunnel used before the migration, or may be the uplink tunnel used after the migration. The information may include only the uplink tunnel used before the migration, or only the uplink tunnel used after the migration, or may include both the uplink tunnel used before the migration and the uplink tunnel used after the migration. For a tunnel, the information includes at least one of the following information:

Tunnel identification information

An IP address

A TEID

Routing identification information. The information is used to indicate the transmission path of the above-mentioned uplink data (further, the uplink data is sent through the above-mentioned tunnel), and includes address information of the receiving node (such as a BAP address) and/or the transmission path identification information (such as a path ID). Further, according to this information, the relay node can add this information into the uplink data packet sent through the above-mentioned tunnel Identification information of a next-hop node. The next-hop node is a node that directly receives the uplink data when the relay node sends the uplink data (further, the uplink data is sent through the above-mentioned tunnel). In other words, the relay node sends the uplink data to the next-hop node, and then the next-hop node sends it directly or indirectly (through other nodes) to the destination node of the uplink data. According to this information, the relay node knows which node to send the uplink data to Identification information of a backhaul link channel. The backhaul link channel is a backhaul link channel used by the relay node when sending the uplink data (further, the uplink data is sent through the above-mentioned tunnel) to the above-mentioned next-hop node. According to this information, the relay node knows which backhaul link channel to use to send the uplink data One beneficial effect of containing this information is that the receiving node can update the configuration of the uplink tunnel of the user data according to the information, and learn the configuration of uplink data transmission, such as the transmission path of the uplink data packet, the information that needs to be added in the uplink data packet, the next-hop node receiving the uplink data packet, the backhaul link channel used to transmit the uplink data packet; another beneficial effect of containing this information is that the receiving node can learn the configuration information of the uplink tunnel of the radio bearer served by the relay node, thereby helping the receiving node to update the configuration information of the uplink tunnel; another beneficial effect of containing this information is that the receiving node can configure the uplink tunnel of the radio bearer served by the relay node according to the received information.

Information related to a tunnel of downlink data. The downlink data is the data sent by the donor (anchor) node to the relay node. The tunnel may refer to one or more tunnels. The information indicates information of a relay node or a distributed unit portion of the relay node. When the relay node migrates, the tunnel may be the downlink tunnel used before the migration, or may be the downlink tunnel used after the migration. The information may include only the downlink tunnel used before the migration, or only the downlink tunnel used after the migration, or may include both the downlink tunnel used before the migration and the downlink tunnel used after the migration. For a tunnel, the information includes at least one of the following information:

Tunnel identification information

An IP address

A TEID

Configuration value information of a differentiated services code point (DSCP) field in a downlink data packet (further, the downlink data packet is sent through the above-mentioned tunnel)

Configuration value information of a flow label field in the downlink data packet (further, the downlink data packet is sent through the above-mentioned tunnel)

Figure 3:
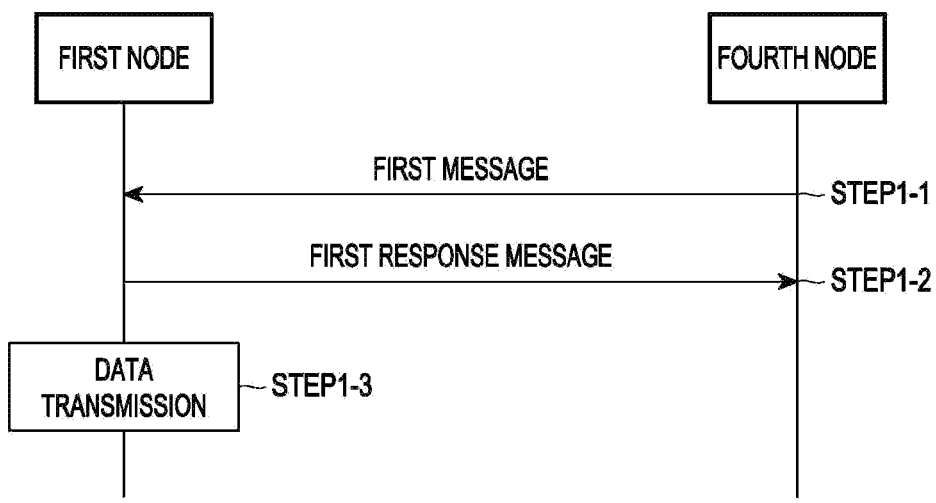
FIG. 3 shows a process that a first node performs data transmission according to an embodiment of the present disclosure.

One beneficial effect of containing this information is that the receiving node can update configuration of the downlink tunnel of the user data according to the information, and learn the configuration of downlink data transmission, such as the information contained in a downlink data packet (such as the configuration value of the DSCP field, the configuration value of the flow label field); another beneficial effect of containing this information is that the receiving node can learn how to send the downlink data to the relay node, such as the address for receiving the downlink data, the information that needs to be contained in the downlink data packet (such as the configuration value of the DSCP field, the configuration value of the flow label field); another beneficial effect of containing this information is that the receiving node can configure the downlink tunnel of the radio bearer served by the relay node according to the received information The First Aspect of the Disclosure The first node (relay node) migrates. The migration may be any one of the above-mentioned Intra-CU/intra-DU (the same donor (anchor) node central unit and the same donor (anchor) node distributed unit), Intra-CU/inter-DU (the same donor (anchor) node central unit and different donor (anchor) node distributed units), and Inter-CU/inter-DU (different donor (anchor) node central units and different donor (anchor) node distributed units) shown in FIG. 2. In order for the first node to perform data transmission on the target path, it is necessary to configure a tunnel (such as the tunnel used for transmitting the DRB) or transport layer association (such as the transport layer association used for transmitting the F1-C data (F1-C Traffic)) used for transmitting data between the first node (or the distributed unit portion of the first node) and the second or third node, and further, it is necessary to configure the backhaul link information used for transmitting the data on the above-mentioned tunnel or transport layer association (such as BH Information, this information may include a BAP routing identification, i.e. a BAP routing ID, an identification of a backhaul link channel, identification or address information of a next-hop node, such as a BAP address). However, it takes time to complete these configurations. Before the configuration of the tunnel and/or the transport layer association and/or the backhaul link is completed, the first node cannot perform transmission of the data on the tunnel or on the transport layer association with the second node or the third node. Therefore, in order to avoid the interruption of data transmission or reduce the time delay of data transmission, the methods considered in the present disclosure are as follows:

In the procedure of migration or after the migration, the first node keeps the configuration on the source path, thus utilizing the source path to perform data transmission After the mobile terminal portion of the first node hands over to the target path (for example, after the random access procedure is completed), the first node utilizes the target path to perform data transmission with the second node or the third node In order to implement the above method, FIG. 3 shows an example of a process that a first node performs data transmission according to an embodiment of the present disclosure. As shown in FIG. 3, the process of the present disclosure includes the following steps:

Step 1-1: A fourth node sends a first message to a first node. The first message may be a first configuration request message. The first message includes information for configuring the first node to perform migration. The function of the message is for configuring the first node to perform migration. In one embodiment, when the first node migrates, the message indicates the configuration information required by the first node in the procedure of migration and/or after the migration (or the configuration information required by the first node after the configuration is updated). The fourth node may be a node to which the first node is connected before the migration (such as the second node described above), or may be a node to which the first node is connected after the migration (such as the third node described above). It should be noted that 'before the migration (or before the configuration is updated) as mentioned above or below' may refer to 'before the first node receives the first message'. One or more pieces of information in the message may be determined by the fourth node and then sent by the fourth node to the first node through the message, or may be determined by the above-mentioned second node and sent to the first node through the message, or may be determined by the above-mentioned third node and sent to the first node through the message, or may be determined by the third node and then sent to the second node, and finally sent by the second node to the first node. The message includes at least one of the following information:

Information related to a backhaul link, which configures the backhaul link used by the first node, and the information includes at least one of the following information:

Address information used when serving the backhaul link, such as BAP address information (a BAP address). In one embodiment, the address may be the address information used by the first node after migration Configuration information of a default backhaul link, which indicates the information used by the first node before it obtains the configuration of the backhaul link used for transmitting various types of data (for example, in the procedure that the relay node accesses the network initially, in the procedure of migration, in the procedure of RRC recovery, in the procedure of RRC reconstruction, and so on). In the procedure of migration of the first node, the information may be the configuration information used by the first node after accessing the target path, and then the backhaul link (such as a backhaul link channel, a routing identification, etc.) configured in the configuration information is the backhaul link used by the first node on the target path. In an embodiment, the configuration information of a default backhaul link may not distinguish data types, so that the transmission of all types of data uses the same set of configurations. In another embodiment, the configuration information of a default backhaul link can distinguish different types of data, so that for transmission of each type of data, the information will include a set of configurations. Regardless of which implementation is adopted, for a set of configurations, the information includes at least one of the following information:

Default routing identification information used for transmitting uplink data

Identification information of a default backhaul link channel used for transmitting data which can include both downlink data and uplink data Identification information of a default backhaul link channel used for transmitting the uplink data Identification information of a default backhaul link channel used for receiving the downlink data Indication information of a type of transmitted data. The type of data indicated by the information may be one or more of the above-mentioned "types of data transmitted by the relay node on a backhaul link". Further, the indication information can be an explicit indication or an implicit indication (for example, a name of an information element (IE) contained in the message can be used as an indication of the data type)

Specifically, the above-mentioned "configuration information of a default backhaul link" may have the following possible implementations (the following implementations are only examples, and other possible implementations are not excluded). In an implementation, a default configuration is given for the transmission of user plane data, and the information includes at least one of the following information:

Default routing identification information used for transmitting uplink user plane data Identification information of a default backhaul link channel used for transmitting user plane data which can include both downlink data and uplink data Identification information of a default backhaul link channel used for transmitting the uplink user plane data Identification information of a default backhaul link channel used for receiving downlink user plane data In an implementation, a default configuration is given for the transmission of non-user plane data, and the information includes at least one of the following information:

Default routing identification information used for transmitting uplink non-user plane data Identification information of a default backhaul link channel used for transmitting non-user plane data which can include both downlink data and uplink data Identification information of a default backhaul link channel used for transmitting the uplink non-user plane data Identification information of a default backhaul link channel used for receiving downlink non-user plane data In an implementation, a default configuration is given for the transmission of user plane data and non-user plane data, and the information includes at least one of the following information:
- Default routing identification information used for transmitting uplink data. This configuration indicates that the uplink user plane data and non-user plane data use the same default routing identification information
- Identification information of a default backhaul link channel used for transmitting the user plane data which can include both downlink data and uplink data
- Identification information of a default backhaul link channel used for transmitting the non-user plane data which can include both downlink data and uplink data
- Identification information of a default backhaul link channel used for transmitting the uplink user plane data
- Identification information of a default backhaul link channel used for transmitting the uplink non-user plane data
- Identification information of a default backhaul link channel used for receiving downlink user plane data
- Identification information of a default backhaul link channel used for receiving downlink non-user plane data In addition, the above-mentioned "configuration information of a default backhaul link" may be separately given for different nodes that perform data transmission with the first node. For example, the above-mentioned "configuration information of a default backhaul link" will contain the configuration information used when the first node performs data transmission with the second node, and may also contain the configuration information used when the first node performs data transmission with the third node.

The beneficial effect of the above-mentioned "configuration information of a default backhaul link" is that before the first node has not obtained the configurations of backhaul links used for transmitting various types of data (such as the configuration of a backhaul link channel, the configuration of an IP address, the configuration of a tunnel, the information of a backhaul link (such as a backhaul link channel, a BAP routing identification, a BAP address or identification of a next-hop node, etc.), etc.), the first node can transmit data (such as the data of the distributed unit portion of the first node) on the target path according to this information, thereby the time delay of data transmission in the migration procedure of the first node can be reduced. In an implementation, after the first node migrates, the first node can use the configuration indicated by the above-mentioned "configuration information of a default backhaul link" on the target path to perform data transmission (such as sending of uplink data, and/or receiving of downlink data). The data may be the transmission performed between the first node and the third node or may be the transmission performed between the first node and the second node. And in the procedure of transmission, the first node needs to send the data to the distributed unit of the donor (anchor) node on the target path via the target path, and then the data is sent to the second node by the distributed unit of the donor (anchor) node on the target path, or the data needs to be sent by the second node to the distributed unit of the donor (anchor) node on the target path, and is then sent to the first node by the distributed unit of the donor (anchor) node on the target path via the target path.

- Address-related information, which indicates the information related to an address used by the first node when communicating with the network side (such as the fourth node, and/or the second node, and/or the third node). In an embodiment, the address may be an IP address. The information contained in this information is the address used by the first node when communicating with the connected node (such as the third node) after the migration (or after the configuration is updated), and the information includes at least one of the following information:
- Index information of the address
- IP address information
- Usage information of the IP address, which indicates types of data transmitted by using the above IP address, such as for transmitting the control plane data of the F1 interface, for transmitting the user plane data of the F1 interface, for transmitting the data of the non-F1 interface, and so on
- Address information of a distributed unit of an donor (anchor) node corresponding to the IP address, such as BAP address information
- Information related to configuration keep, which indicates the configuration that needs to be kept by the first node. In one embodiment, when the first node migrates, the information indicates the configuration information that the first node needs to keep in the procedure of migration or after the migration. The kept configuration information is the configuration information used before the migration. The kept configuration is used for the first node to continue to keep performing data transmission with the node connected before the migration (that is, the node on the source path) in the procedure of migration or after the migration. In another embodiment, when the configuration update occurs on the first node, this information indicates the configuration information that the first node needs to continue to keep after the configuration is updated. The kept configuration information is the configuration information used before the configuration is updated. The kept configuration is used for the first node to continue to keep performing data transmission with the node connected before the configuration is updated after the configuration is updated. The information includes at least one of the following information:
- Indication information for keeping configuration. The function of this information is to indicate that the first node continues to keep the configuration with the connected node before the migration (or before the configuration is updated), and then the first node can continue to serve the first node or the distributed unit portion of the first node by utilizing the source path. The configuration that needs to be kept includes the configuration (such as BAP configuration, backhaul link channel configuration, etc.) of the mobile terminal portion and the configuration (such as the configuration of the tunnel, the configuration of the transport layer association, the information of the backhaul link, the configuration of the address, etc.) of the distributed unit portion of the first node. In an embodiment, the function of the configuration is to serve the distributed unit portion of the first node on the source path. In an embodiment, the indication information indicates that the first node keeps the configuration required to transmit the data of its distributed unit portion on the source path, such as Keep Source BAP Indication, Keep Source BH (backhaul) link Indication, etc. The indication information can be a piece of explicit information, or may be a piece of implicit information. As an example, the indication information can be implicitly indicated through DAPS-config (TS38.331), but it should be noted that this manner expands the function of DAPS-config IE in the traditional technology and changes the behavior of the receiving node. In the traditional technology, the DAPS-config IE is given for a DRB, that is, a DRB request containing the IE configures the DRB as a DAPS bearer, and then the transmission of the DRB data needs to be performed in accordance with the existing DAPS mechanism. However, in the present disclosure, if the configuration information of at least one DRB received by the first node contains the DAPS-config IE, the first node is implicitly notified to reserve the configuration required for serving the first node or the distributed unit portion of the first node on the source path (such as BAP configuration, and/or backhaul link channel configuration, the configuration of the tunnel, the configuration of the transport layer association, the information of the backhaul link, the configuration of the address, etc.)

Indication information for keeping backhaul link channel. This information is used to indicate one or more backhaul link channels used on the source path, which need to be kept. For a backhaul link channel, the indication information includes the identification information of the backhaul link channel. Further, after receiving the indication information, the first node will continue to use the source path to transmit the data transmitted by these backhaul link channels Indication information for keeping configuration of a mobile terminal portion of the first node. The configuration of the mobile terminal portion may include BAP configuration, and/or backhaul link channel configuration, etc.

Indication information for keeping configuration of a distributed unit portion of the first node. The configuration of the distributed unit portion may include the configuration of the tunnel, the configuration of the transport layer association, the information of the backhaul link, the configuration of the address, etc.

Information of configuration that the first node needs to keep. The function of this information is to notify the first node of the configuration that needs to be kept. The information includes at least one of the following information:

Configuration of BAP. The configuration information includes at least one of the following information: 1) a BAP address of the first node; 2) default routing identification information; 3) identification information of a default backhaul link channel A BAP address Default routing identification information Identification information of a default backhaul link channel Identification information of a backhaul link channel. The first node will be configured with one or more backhaul link channels on the source path. This information gives the identification information of one or more backhaul link channels that need to be kept. Further, the information also implicitly indicates it is necessary to keep the configuration information of the data transmitted on the channel, such as the configuration of the tunnel, the configuration of the transport layer association, etc.

Configuration information of a tunnel, which indicates the configuration of the tunnel that needs to be kept. The tunnel can be an uplink tunnel or a downlink tunnel. For a tunnel, the configuration information includes at least one of the following information:

Identification information of the tunnel

Information of the tunnel, such as an IP address and/or a GTP-U TEID. The IP address is the IP address of one end of the tunnel Information of the downlink tunnel, such as an IP address and/or a GTP-U TEID. The IP address can be the IP address of the first node side (such as the address of the distributed unit portion side of the first node)

Information of the uplink tunnel, such as an IP address and/or a GTP-U TEID. The IP address can be the address of the donor (anchor) node side (or the central unit side of the donor (anchor) node or the user plane portion side of the central unit of the donor (anchor) node)

Configuration information of a transport layer association, which indicates the configuration of the transport layer association that needs to be kept. The information includes at least one of the following information:

Identification information of the transport layer association

Information of the transport layer association, such as an IP address and/or a port. The IP address is the IP address of one end of the transport layer association Information of a downlink transport layer association, such as an IP address and/or a port. The IP address can be the IP address of the first node side (such as the address of the distributed unit portion side of the first node)

Information of a uplink transport layer association, such as an IP address and/or a port. The IP address can be the address of the donor (anchor) node side (or the central unit side of the donor (anchor) node or the user plane portion side of the central unit of the donor (anchor) node)

Configuration information of an address, which indicates the address that needs to be kept, and the address can be an IP address or a BAP address. In an implementation, the information can be contained in a new IE (such as Kept Address). In an implementation, the information can be contained in an existing IE, such as IAB-IP-AddressConfiguration-r16 IE (TS38.331) of the traditional technology. Specifically, if the IAB-IP-AddressConfiguration-r16 IE is used to add a new IP address, further, indication information can be added in the IE, and the indication information indicates that the first node needs to keep the address corresponding to the index information contained in the IE before the migration (or before the configuration is updated). If the IE is used to update the IP address, further, indication information can be added in the IE, and the indication information indicates that the first node needs to keep the address before the update and use the new IP address Configuration of a transmission route. This information indicates the transmission route that needs to be kept. There may be one or more transmission routes that need to be kept. For a transmission route, the configuration includes at least one of a destination BAP address and a path identification Indication information for keeping one or more of the above configurations Information related to a type of data kept. The function of this information is to indicate information of the type of data that the first node can continue to use the configuration used before the migration (or before the configuration is updated) to transmit after the migration (or after the configuration is updated). In one embodiment, if the first node migrates, the information indicates the type of data that needs to be kept for transmission on the source path. The information may include at least one of the following information:

All data, such as the data of the F1 interface, the data of the non-F1 interface, the control plane data of the F1 interface, the user plane data of the F1 interface, etc.

Control plane data of the F1 interface, such as F1-C traffic

User plane data of the F1 interface, such as F1-U traffic

Data of the non-F1 interface, such as non-F1 traffic

Control plane data of the F1 interface associated with a user, such as UE-associated F1-C traffic Control plane data of the F1 interface associated with non-user, such as non-UE-associated F1-C traffic Control data of a BAP layer, such as a BAP Control PDU Uplink data Downlink data Indication information for keeping, the function of which is to indicate that the above-mentioned one or more types of data will continue to be transmitted with the configuration used before the migration (or before the configuration is updated)

Indication information for keeping source path. The function of the indication information is that when the first node migrates, the first node can still continue to keep communication with the node on the source path as well as the configuration information required to support the communication. Further, the "communication with the node on the source path" can be the communication performed through the backhaul link channel, the "configuration information required to support the communication" can be the BAP configuration, the configuration of the backhaul link channel, the configuration of the address (such as an IP address, a BAP address), the configuration of the tunnel, etc.

Information of length of time to keep configuration, which indicates the length of time that the above configuration needs to be kept According to the above "information related to configuration keep", the first node can still keep the configurations before the migration (or the configuration is updated) in the procedure of migration (the procedure of configuration update) or after the migration (or the configuration is updated), so as to utilize such configuration information to perform data transmission with the connected nodes before the migration (or the configuration is updated) (such as other relay nodes, and/or donor (anchor) nodes, and/or nodes on the source path). Optionally, before step 1-1, the fourth node may also acquire the information for configuring the first node to perform migration, including the fourth node acquiring the information for configuring the first node to perform migration from other nodes and/or the fourth node generating the information for configuration for the first node to perform migration.

Step 1-2: (Optional) The first node sends a first response message to the fourth node. The first response message may be a first configuration request response message. The function of this message is to confirm to the fourth node that the first node has received the foregoing first message, and to further confirm that the first node has completed the configuration contained in the first message.

Step 1-3: The first node performs data transmission according to the first message in step 1-1. In this step, the first node can perform data transmission in accordance with one or more of the following manners in the procedure of migration (or the procedure of configuration update) and/or after the migration (the configuration is updated):

The first node performs data transmission through the connected node before the migration (or before the configuration is updated). In one embodiment, the connected node is a node in the source path used before the migration. The first node can perform data transmission according to the "information related to configuration keep" contained in step 1-1

The first node performs data transmission through the connected node after the migration (or after the configuration is updated). In one embodiment, the connected node is a node in the target path used after the migration. The data transmitted through the target path may be finally sent to the third node. The data transmitted through the target path can also be finally sent to the second node. In this way, the data transmitted through the target path can be directly or indirectly sent by the first node to the distributed unit of the donor (anchor) node on the target path, and then sent by the distributed unit of the donor (anchor) node on the target path to the second node, or sent by the second node to the distributed unit of the donor (anchor) node on the target path, and then directly or indirectly sent by the distributed unit of the donor (anchor) node on the target path to the first node The beneficial effects of the above process are:

1) In the procedure of the migration (or the procedure of configuration update), the relay node can keep communication with the source path (or the path where the relay node is before the configuration is updated), thereby avoiding or reducing the interruption and the time delay of user data transmission 2) After the migration (after the configuration is updated), the relay node can send user's data through the target path used after the migration (after the configuration is updated), thereby avoiding or reducing the interruption and the time delay of user data transmission In order to further illustrate the beneficial effects after performing the above steps 1-1 and 1-2, they will be further described as follows in conjunction with specific embodiments:

Embodiment 1-1 (Configuring the First Node to Perform Data Transmission on the Target Path)

In this embodiment, the first node can utilize the target path to perform communication with the second node to which it is connected before the migration, in which the process involved is as follows:

Step 1-1-1: The fourth node sends the first message to the first node. The fourth node can be the node to which the first node is connected before the migration (such as the second node described above), or can be the node to which the first node is connected after the migration (such as the third node described above). The second node and the third node may be the same node, or may be different nodes. The first message includes at least one of the following information:

Information related to a backhaul link, and please refer to the "information related to a backhaul link" in the above step 1-1

The information related to an address required by the first node, and please refer to the "address-related information" in the above step 1-1

Step 1-1-2: (Optional) The first node sends the first response message to the fourth node.

Figure 4A:
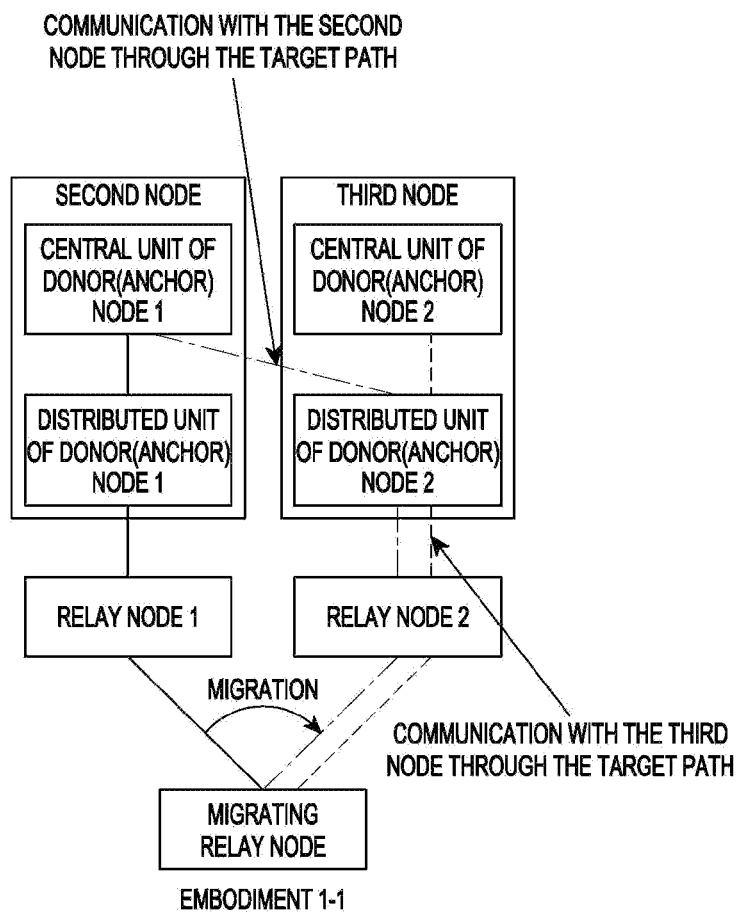
FIG. 4A shows an example in which the first node performs data transmission with a second node or a third node on a target path according to an embodiment of the present disclosure.

Step 1-1-3: The first node performs data transmission with the second node or the third node on the target path. For example, FIG. 4A shows an example that the first node performs data transmission with the second node or the third node on the target path according to an embodiment of the present disclosure.

The first node performs data transmission with the second node or the third node according to the "configuration information of a default backhaul link" in step 1-1-1. The data can be the non-user plane data (such as the control plane data of the F1 interface, the data of the non-F1 interface) and/or the user plane data of the F1 interface The first node performs transmission of uplink data with the second node or the third node according to the "configuration information of a default backhaul link" in step 1-1-1. The data can be the non-user plane data (such as the control plane data of the F1 interface, the data of the non-F1 interface) and/or the user plane data of the F1 interface The first node performs transmission of downlink data with the second node or the third node according to the "configuration information of a default backhaul link" in step 1-1-1. The data can be the non-user plane data (such as the control plane data of the F1 interface, the data of the non-F1 interface) and/or the user plane data of the F1 interface In the procedure of data transmission, the address used by the first node side can be the "information related to an address required by the first node" configured in step 1-1-1, or can be the address used by the first node before the migration (or before the configuration is updated).

The beneficial effect of this embodiment is that in the procedure of migration, the first node can keep the data transmission with the second node through the target path, thereby reducing the time delay of the data transmission in the procedure of migration of the first node, or avoiding the interruption in data transmission in the procedure of migration of the first node. The data transmission may occur before the tunnel or the transport layer association is established and the corresponding backhaul link is configured between the first node and the third node.

Embodiment 1-2 (Configuring the First Node to Keep the Data Transmission on the Source Path)

In this embodiment, the relay node may perform data transmission with the second node through the source path in the procedure of migration or after the migration. The process contained in this embodiment is as follows:

Step 1-2-1: The fourth node sends the first message to the first node. The fourth node can be the node to which the first node is connected before the migration (such as the second node described above), or can be the node to which the first node is connected after the migration (such as the third node described above). The second node and the third node may be the same node, or may be different nodes. The first message includes at least one of the following information:

The information related to an address required by the first node, and please refer to the "address-related information" in the above step 1-1

Information related to configuration keep, and please refer to the "information related to configuration keep" in the above step 1-1

Step 1-2-2: (Optional) The first node sends the first response message to the fourth node.

Figure 4B:
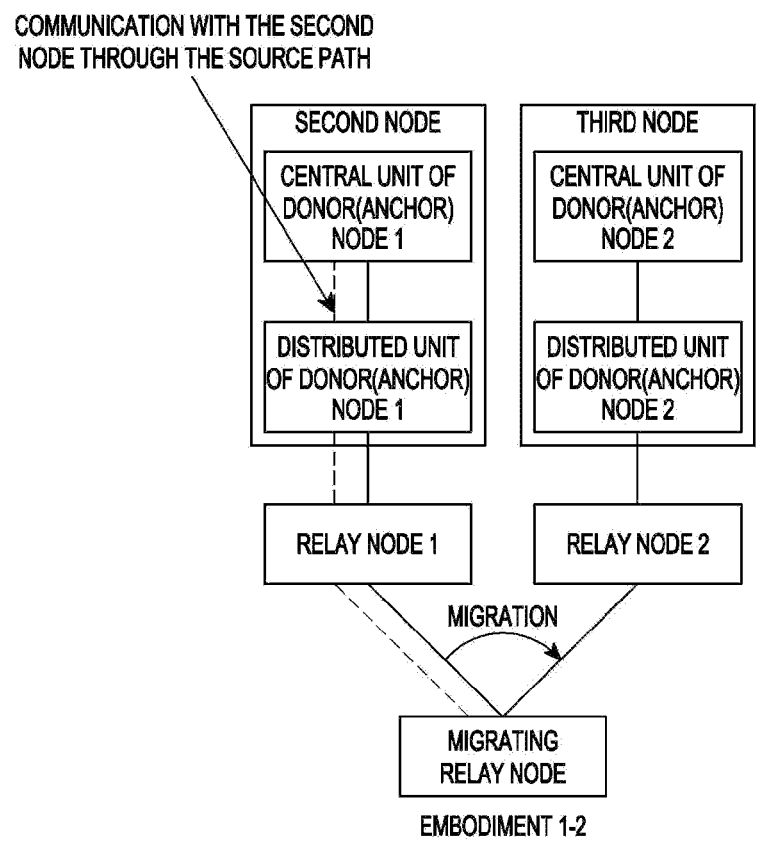
FIG. 4B shows an example in which the first node performs data transmission with the second node on a source path according to an embodiment of the present disclosure.

Step 1-2-3: The first node performs data transmission with the second node on the source path. For example, FIG. 4B shows an example that the first node performs data transmission with the second node on the source path according to an embodiment of the present disclosure.

The first node transmits data with the second node according to the "information related to configuration keep" in step 1-2-1, and the data can be the non-user plane data (such as the control plane data of the F1 interface, the data of the non-F1 interface) and/or the user plane data of the F1 interface The first node transmits downlink data with the second node according to the "information related to configuration keep" in step 1-2-1, and the data can be the non-user plane data (such as the control plane data of the F1 interface, the data of the non-F1 interface) and/or the user plane data of the F1 interface The first node transmits uplink data with the second node according to the "information related to configuration keep" in step 1-2-1, and the data can be the non-user plane data (such as the control plane data of the F1 interface, the data of the non-F1 interface) and/or the user plane data of the F1 interface In addition, because the first node may have established a connection with the third node, in the above step 1-2-3, the first node may also utilize the target path to transmit data with the third node.

In the procedure of data transmission, the address used by the first node side can be the "information related to an address required by the first node" configured in step 1-2-1, or can be the address used by the first node before the migration (or before the configuration is updated).

The beneficial effect of this embodiment is that in the procedure of migration, the first node can keep the data transmission with the second node through the source path, thereby reducing the time delay of the data transmission in the procedure of migration of the first node, or avoiding the interruption in data transmission in the procedure of migration of the first node. The data transmission may occur before the tunnel or the transport layer association is established and the corresponding backhaul link is configured between the first node and the third node.

Embodiment 1-3 (the First Node Performs Transmission of Data Through the Source Path and the Target Path)

This embodiment utilizes the source path and the target path to perform data transmission at the same time, in which the process involved is as follows:

Step 1-3-1: The fourth node sends the first message to the first node. The fourth node can be the node to which the first node is connected before the migration (such as the second node described above), or can be the node to which the first node is connected after the migration (such as the third node described above). The second node and the third node may be the same node, or may be different nodes. The first message includes at least one of the following information:

Information related to a backhaul link, and please refer to the "information related to a backhaul link" in the above step 1-1

The information related to an address required by the first node, and please refer to the "address-related information" in the above step 1-1

Information related to configuration keep, and please refer to the "information related to configuration keep" in the above step 1-1

Step 1-3-2: (Optional) The first node sends the first response message to the fourth node.

Figure 4C:
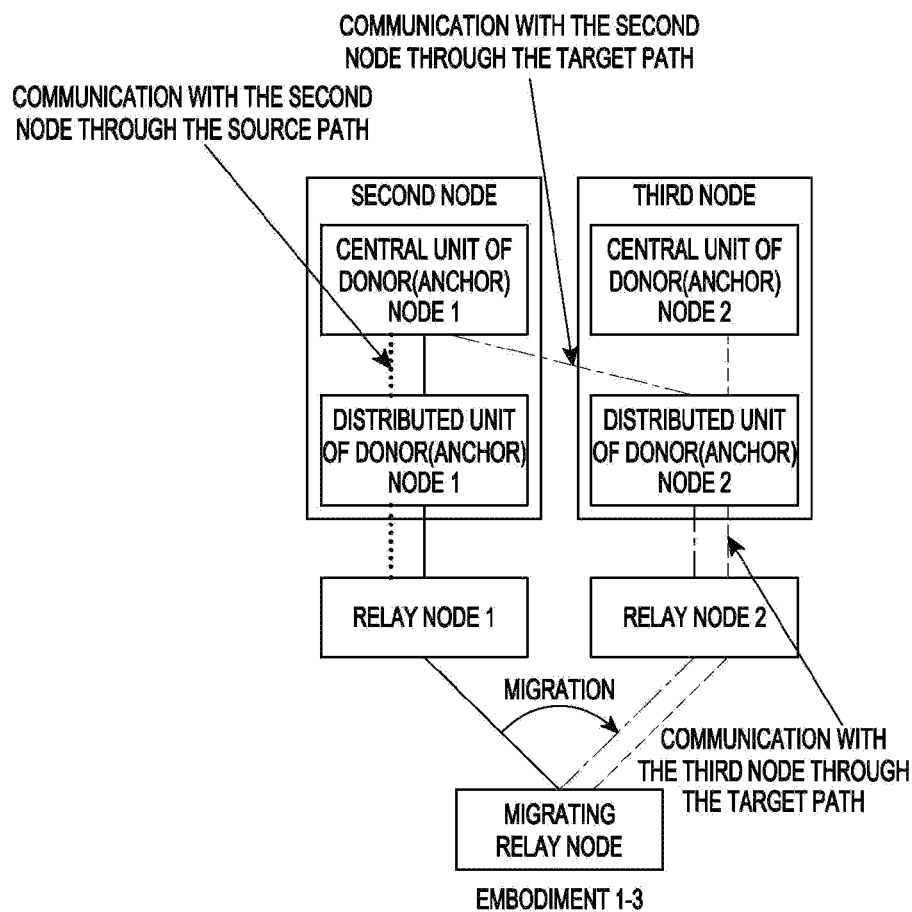
FIG. 4C shows an example in which the first node performs data transmission with the second node or the third node on the source path and the target path according to an embodiment of the present disclosure.

Step 1-3-3: The first node performs data transmission with the second node or the third node on the source path and the target path. For example, FIG. 4C shows an example that the first node performs data transmission with the second node or the third node on the source path and the target path according to an embodiment of the present disclosure.

The first node performs data transmission with the second node on the target path according to the "configuration information of a default backhaul link" in step 1-3-1. The data can be the non-user plane data (such as the control plane data of the F1 interface, the data of the non-F1 interface) and/or the user plane data of the F1 interface The first node performs transmission of uplink data with the second node on the target path according to the "configuration information of a default backhaul link" in step 1-3-1. The data can be the non-user plane data (such as the control plane data of the F1 interface, the data of the non-F1 interface) and/or the user plane data of the F1 interface The first node performs transmission of downlink data with the second node on the target path according to the "configuration information of a default backhaul link" in step 1-3-1. The data can be the non-user plane data (such as the control plane data of the F1 interface, the data of the non-F1 interface) and/or the user plane data of the F1 interface The first node transmits data with the second node on the source path according to the "information related to configuration keep" in step 1-3-1, and the data can be the non-user plane data (such as the control plane data of the F1 interface, the data of the non-F1 interface) and/or the user plane data of the F1 interface The first node transmits downlink data with the second node on the source path according to the "information related to configuration keep" in step 1-3-1, and the data can be the non-user plane data (such as the control plane data of the F1 interface, the data of the non-F1 interface) and/or the user plane data of the F1 interface The first node transmits uplink data with the second node on the source path according to the "information related to configuration keep" in step 1-3-1, and the data can be the non-user plane data (such as the control plane data of the F1 interface, the data of the non-F1 interface) and/or the user plane data of the F1 interface In addition, because the first node may have established a connection with the third node, in the above step 1-3-3, the first node may also utilize the target path to transmit data with the third node.

In the procedure of data transmission, the address used by the first node side can be the "information related to an address required by the first node" configured in step 1-3-1, or can be the address used by the first node before the migration (or before the configuration is updated).

The beneficial effect of this embodiment is that in the procedure of migration, the first node can keep the data transmission with the second node through the source path and the target path, thereby reducing the time delay of the data transmission in the procedure of migration of the first node, or avoiding the interruption in data transmission in the procedure of migration of the first node. The data transmission may occur before the tunnel or the transport layer association is established and the corresponding backhaul link is configured between the first node and the third node.

If the relay node is in the procedure of migration, its mobile terminal portion can perform handover in accordance with the existing dual active protocol stack (DAPS) mechanism. In this mechanism, after receiving the RRC message for handover, the user or the mobile terminal portion of the relay node still keeps the connection with the source base station/the source donor (anchor) node/the central unit of the source donor (anchor) node/the control plane portion of the central unit of the source donor (anchor) node. When the user or the mobile terminal portion of the relay node receives information for releasing the source cell after successfully accessing the target base station/the target donor (anchor) node/the central unit of the target donor (anchor) node/the control plane portion of the central unit of the target donor (anchor) node (the target donor (anchor) node/the central unit of the target donor (anchor) node/the control plane portion of the central unit of target donor (anchor) node may be the same as the source donor (anchor) node/the central unit of the source donor (anchor) node/the control plane portion of the central unit of the source donor (anchor) node), it will disconnect from the source base station/the source donor (anchor) node/the central unit of the source donor (anchor) node/the control plane portion of the central unit of the source donor (anchor) node. In one embodiment, when the mobile terminal portion is in the procedure of accessing a node on the target path, the mobile terminal portion can keep the uplink and downlink data transmission with the source path. After the mobile terminal portion successfully accesses the node on the target path, for example, after the random access procedure is completed, the mobile terminal portion can keep the downlink data transmission with the source path, but the uplink data transmission needs to be performed through the target path. As such, according to the content of the first aspect of the present disclosure, the relay node can utilize the source path to keep the reception of the user data, such as the reception of the downlink data, and at the same time, can utilize the target path to send data, such as send the uplink data to the second node or the third node. An implementation is to send the data of the user plane to the second node, and to send the data of the non-user plane to the third node.

Figure 5:
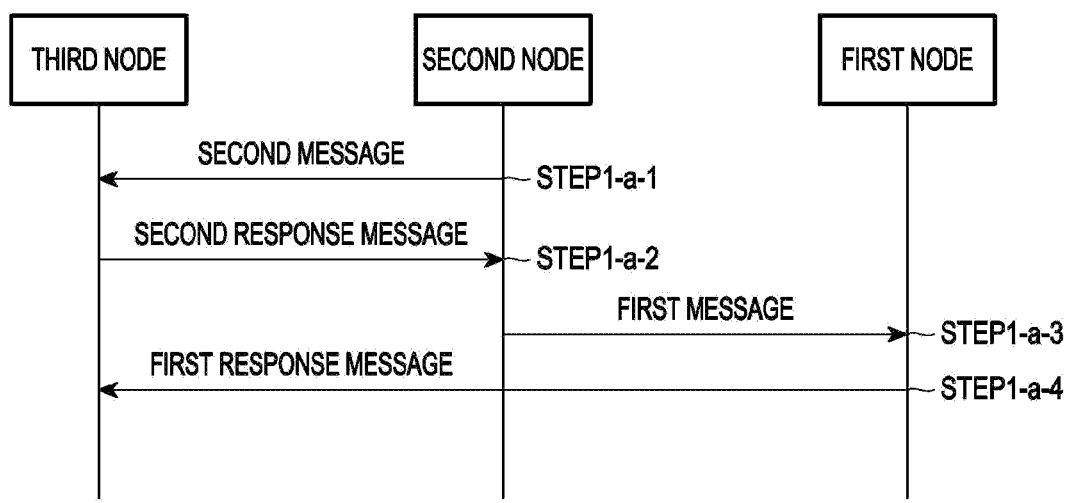
FIG. 5 shows an example of the migration procedure of the first node according to an embodiment of the present disclosure.

FIG. 5 shows an example of a migration procedure of a first node according to an embodiment of the present disclosure. As shown in FIG. 5, if the second node and the third node are two different nodes in the migration procedure of the first node as described above, the following process may also be included:

Step 1-a-1: The second node sends a second message to the third node. The second message may be a first handover request message, and the second message includes the information for requesting to configure the first node to migrate. The function of this message is to send the configuration information related to the first node to the third node, so as to facilitate the third node to generate the configuration information of the first node after the migration. For the content contained in the message, please refer to the HANDOVER REQUEST message in TS38.423 and/or TS36.423. In addition, the message can also include at least one of the following information:

Configuration information of the first node. For the information contained in this information, please refer to the above "configuration information of user (or user context information)"

Request information related to an address of the first node. The function of this information is to send the information related to the address of the first node to the third node, or to send the information for requesting to configure an address for the first node to the third node. The information includes at least one of the following information:

Address request information, the function of which is to request the third node to configure the address of the first node. This information includes at least one of the following information:

Information of the number of requested addresses. The addresses can be either IPv4 addresses or IPv6 addresses. The requested addresses can be used for all types of data transmission Indication information of usage of a requested address. The usage indicated by the indication information may be one or more of the following usages: transmission of F1-C traffic, transmission of F1-U traffic, transmission of non-F1 traffic, etc.

Information of the number of addresses requested to be used for F1-C traffic. The addresses can be IPv4 addresses or IPv6 addresses Information of the number of addresses requested to be used for F1-U traffic. The addresses can be IPv4 addresses or IPv6 addresses Information of the number of addresses requested to be used for non-F1 traffic. The addresses can be IPv4 addresses or IPv6 addresses Indication information of an address request, the function of which is to indicate to the third node whether a new address is needed. The address can be an IPv4 address, an IPv6 address, or a prefix of the IPv6 address. The information includes at least one of the following information:

Indication information for requesting an address used for data transmission

Indication information for requesting an address used for the F1-C traffic

Indication information for requesting an address used for the F1-U traffic

Indication information for requesting an address used for the non-F1 traffic

Address information used on the source path, the function of which is to notify the third node of the information related to an address used by the first node on the source path. This information may contain one or more addresses. For an address, the information includes at least one of the following information:

Address index information, such as an Address Index

Address information, such as an IPv4 address, an IPv6 address, an IPv6 prefix

Address information for F1-C traffic, such as an IPv4 address, an IPv6 address, an IPv6 prefix Address information for F1-U traffic, such as an IPv4 address, an IPv6 address, an IPv6 prefix Address information for non-F1 traffic, such as an IPv4 address, an IPv6 address, an IPv6 prefix Indication information of usage of the address. The usage indicated by the indication information may be one or more of the following usages: transmission of the F1-C traffic, transmission of the F1-U traffic, transmission of the non-F1 traffic, etc.

Indication information for requesting to keep the above address, the function of which is that the second node requests the third node to reserve the address used on the source path. Further, the indication information can be given for each address respectively, or can be given for all addresses, that is, if the indication information is contained, it indicates that the second node requests to reserve all addresses used on the source path The beneficial effect of this information is to help the third node learn the address information needed by the first node, so that the third node can determine the address for the target path configured for the first node according to the information. Another beneficial effect is to help the third node to update the address used by the first node.

Information related to a backhaul link of the first node. The backhaul link is a backhaul link served by the mobile terminal portion of the first node. In one embodiment, the backhaul link is a backhaul link used on the source path, and the information includes at least one of the following information:

Information related to a backhaul link channel. One or more backhaul link channels may be included on the backhaul link. For a backhaul link channel, the information includes at least one of the following information:

Identification information of the backhaul link channel

QoS information of the backhaul link channel. For the content contained in this information, please refer to the description in TS38.473

Indication information for requesting to reserve the above-mentioned backhaul link channel. The function of this information is that the second node requests the third node to reserve the backhaul link channel on the source path Indication information of a request for keeping all backhaul link channels. The function of this information is that the second node requests the third node to reserve all backhaul link channels on the source path Indication information for requesting to keep configuration. The function of this information is the indication information that the second node requests to keep the configurations on the source path. The indication information may include one of the following information:

Indication information for requesting to reserve configuration on a source path. Further, the configuration may be the configuration required to serve the first node or the distributed unit portion of the first node on the source path, and the configuration includes the configuration (such as BAP configuration, backhaul link channel configuration, etc.) of the mobile terminal portion and the configuration (such as the configuration of a tunnel, the configuration of a transport layer association, the information of a backhaul link, the configuration of an address, etc.) of the distributed unit portion of the first node, such as a Keep BAP Request, a Keep Source BH link Request, etc. The indication information may be an explicit indication, or may be an implicit indication. As an example, the indication information can be implicitly indicated through a DAPS Indicator (TS38.423). However, it should be noted that this method expands the function of DAPS Indicator IE in the traditional technology and changes the behavior of the receiving node. In the traditional technology, the DAPS Indicator IE is given for a DRB, that is, a DRB request containing the IE configures the DRB as a DAPS bearer, and the receiving node will decide whether to accept the request. However, in the present disclosure, if the configuration information of at least one DRB received by the second node contains the DAPS Indicator IE, the second node is implicitly notified that the first node requests to reserve the configuration required for serving the first node or the distributed unit portion of the first node on the source path (such as BAP configuration, and/or backhaul link channel configuration, the configuration of a tunnel, the configuration of a transport layer association, the information of a backhaul link, the configuration of an address, etc.)

Indication information for requesting to keep backhaul link channel. The indication information indicates one or more backhaul link channels requested by the first node to be reserved. For a backhaul link channel, the information may also contain the identification information of the backhaul link channel Indication information for requesting to keep configuration of a mobile terminal portion of the first node. The information indicates that the first node requests to keep the configuration used by the mobile terminal portion to transmit data on the source path. The configuration of the mobile terminal portion may include a BAP configuration, and/or a backhaul link channel configuration, etc.

Indication information for requesting to keep configuration of a distributed unit portion of the first node. The information indicates that the first node requests to keep the configuration used by the distributed unit portion to transmit data on the source path. The configuration of the distributed unit portion may include the configuration of a tunnel, the configuration of a transport layer association, the information of a backhaul link, the configuration of an address, etc.

Indication information of configuration requested to be kept, which indicates that the second node requests to keep the configuration required to serve the first node or the distributed unit portion of the first node on the source path. The configuration requested to be kept can be one or more of the following configurations:

Configuration of BAP. The configuration information includes at least one of the following information: 1) the BAP address of the first node; 2) default routing identification information; 3) identification information of a default backhaul link channel A BAP address Default routing identification information Identification information of a default backhaul link channel Identification information of a backhaul link channel. The first node will be configured with one or more backhaul link channels on the source path. This information gives the identification information of one or more backhaul link channels that need to be kept. Further, the information also implicitly indicates it is necessary to keep the configuration information of the data transmitted on the channel, such as the configuration of a tunnel, the configuration of a transport layer association, etc.

Configuration information of a tunnel, which indicates the configuration of the tunnel that needs to be kept. The tunnel can be an uplink tunnel or a downlink tunnel. For a tunnel, the configuration information includes at least one of the following information:

Identification information of the tunnel

Information of the tunnel, such as an IP address and/or a GTP-U TEID. The IP address is the IP address of one end of the tunnel Information of a downlink tunnel, such as an IP address and/or a GTP-U TEID. The IP address can be the IP address of the first node side (such as the address of the distributed unit portion side of the first node)

Information of a uplink tunnel, such as an IP address and/or a GTP-U TEID. The IP address can be the address of the donor (anchor) node side (or the central unit side of the donor (anchor) node or the user plane portion side of the central unit of the donor (anchor) node)

Configuration information of a transport layer association, which indicates the configuration of the transport layer association that needs to be kept. The information includes at least one of the following information:

Identification information of the transport layer association

Information of the transport layer association, such as an IP address and/or a port. The IP address is the IP address of one end of the transport layer association Information of a downlink transport layer association, such as an IP address and/or a port. The IP address can be the IP address of the first node side (such as the address of the distributed unit portion side of the first node)

Information of a uplink transport layer association, such as an IP address and/or a port. The IP address can be the address of the donor (anchor) node side (or the central unit side of the donor (anchor) node or the user plane portion side of the central unit of the donor (anchor) node)

Configuration information of an address, which indicates the address that needs to be kept, and the address can be an IP address or a BAP address Configuration of a transmission route. This information indicates the transmission route that needs to be kept. The routes that need to be kept may be one or more. For a transmission route, the configuration includes at least one of a destination BAP address and a path identification Information related to a load of the first node. The function of this information is to notify the third node of the load of the first node, which can help the third node to perform access control. The information includes at least one of the following information:

Information of the number of users accessing the first node

Information of the number of bearers served by the first node

Information related to a backhaul link channel configured by the mobile terminal portion of the first node. This information may include identification information of a backhaul link channel, QoS information of a backhaul link channel, etc.

Indication information of a hardware load (such as a Hardware Load Indicator), which indicates the load of the hardware, such as a DL/UL Hardware Load Indicator Indication information of capacity of a transport network layer (such as a TNL Capacity indicator). This information indicates the capacity that the transport network can offer or can use. This information may include one of the following information: the capacity of a uplink/downlink transport network layer that can be offered (a DL/UL TNL offered Capacity), the available capacity of the uplink/downlink transport network layer (a DL/UL TNL available Capacity), etc.

Information of a cell load of the first node, and the information includes at least one of the following information:

Identification information of a cell

Status information of radio resources (Radio Resource Status), which indicates the usage of physical resources of the cell. This information may include one of the following information: a Synchronization Signaling Block Index, indication information of usage of resources for serving downlink/uplink GBR (Guaranteed Bit Rate) traffic within the synchronization signaling block area (such as SSB Area DL/UL GRB PRB usage), indication information of usage of resources for serving downlink/uplink non-GBR traffic within the synchronization signaling block area (such as SSB Area DL/UL non-GRB PRB usage), indication information of usage of resources for serving downlink/uplink traffic within the synchronization signaling block area (such as SSB Area DL/UL total PRB usage), indication information of usage of resources of downlink/uplink scheduling PDCCH (such as DL/UL Scheduling PDCCH CCE usage)

Information of available capacity (such as a Composite Available Capacity Group), which indicates the total level of available uplink/downlink resources for each cell or each SSB area. This information may include one of the following information: Uplink/downlink available resources (such as Composite Available Capacity DL/UL)

Information of available capacity of slices (a Slice Available Capacity), which indicates the amount of resources each network slice has relative to resources of a cell. This information may include one of the following information: indication information of a slice (such as a S-NSSAI), the amount of uplink/downlink resources available for the slice (such as Slice Available Capacity Value UL/DL)

Information of the number of online or active users (Number of Active UEs). This information indicates average number of active users Step 1-a-2: The third node sends a second response message to the second node. The second response message may be a first handover request response message, and includes the information for configuring the first node to migrate. The function of the message is to configure the migration of the first node and/or send the configuration information generated by the third node to serve the first node to the second node. For the content contained in the message, please refer to the HANDOVER REQUEST ACKNOWLEDGE message in TS38.423 and/or TS36.423. In addition, the message can also include one of the following information:

Feedback information related to an address of the first node. The function of this information is to configure address-related information for the first node. The information includes at least one of the following information:

Information of an address configured by the first node, which includes at least one of the following information:

The information related to an address newly added or need to be updated by the first node, and the information includes at least one of the following information:

Address index information, such as an Address Index

Address information, such as an IPv4 address, an IPv6 address, an IPv6 prefix

Address information for F1-C traffic, such as an IPv4 address, an IPv6 address, an IPv6 prefix Address information for F1-U traffic, such as an IPv4 address, an IPv6 address, an IPv6 prefix Address information for non-F1 traffic, such as an IPv4 address, an IPv6 address, an IPv6 prefix Indication information of usage of the address. The usage indicated by the indication information may be one or more of the following usages: transmission of F1-C traffic, transmission of F1-U traffic, transmission of non-F1 traffic, etc.

Address information of a distributed unit of an donor (anchor) node corresponding to the above address, such as a Donor DU BAP Address The information related to the address that the first node needs to release, and the information includes at least one of the following information:

Address index information, such as an Address Index. This information indicates the address that needs to be released Setting value information of an IP packet, which can indicate the setting value of a DSCP field and/or a flow label field in the IP packet. In one embodiment, the information may be respectively given for each address contained in the above-mentioned "information of an address configured by the first node", that is, one piece of this information is configured for each address, and then the second node sets the DSCP field and/or flow label field of the IP packet to the value indicated by the information when sending data to the first node. In another embodiment, the information may be given for one or more or all addresses contained in the above-mentioned "information of an address configured by the first node" and then the second node can set the DSCP field and/or flow label field of the IP packet to the value indicated by the information when sending data to the one or more or all addresses of the first node. As an example, the information can be named as default QoS mapping Information, a default DSCP, a default flow label, etc.

One beneficial effect of this information is that after the second node sets the IP packet in accordance with the information, the IP packet can be sent to the first node via the target path. Further, after receiving the IP packet, the distributed unit of the donor (anchor) node on the target path will determine, according to the destination IP address and/or the setting value of the DSCP field and/or the setting value of the Flow Label field contained in the IP packet, the information used to send the data packet, such as a backhaul link channel, a default backhaul link channel, an address of a next-hop node that receives the data packet (such as a BAP address), a routing identification that needs to be added in the data packet (such as a BAP routing ID, including a BAP address and a path identification), an identification of a transmission route of the data packet (Such as a BAP routing ID, including a BAP address and a path identification), etc.

Response information for keeping configuration. The function of this information is to notify the second node whether the third node accepts the configuration requested to be reserved by the "indication information for requesting to keep configuration" in step 1-a-1. Further, it can also indicate the configuration to be reserved. The information includes at least one of the following information:

Indication information for agreeing to the request, which includes at least one of the following information:

Indication information for accepting to reserve configuration on the source path. Further, the information can be a response given for the "indication information for requesting to reserve configuration on the source path" contained in step 1-a-1

Indication information for accepting to keep backhaul link channel. Further, the information can be a response given for the "indication information for requesting to keep backhaul link channel" contained in step 1-a-1

Indication information for accepting to keep configuration of a mobile terminal portion of the first node. Further, the information may be a response given for the "indication information for requesting to keep configuration of a mobile terminal portion of the first node" contained in step 1-a-1

Indication information for accepting to keep configuration of a distributed unit portion of the first node. Further, the information may be a response given for the "indication information for requesting to keep configuration of a distributed unit portion of the first node" contained in step 1-a-1

Indication information for accepting the kept configuration. Further, the information can be a response given for the "indication information of configuration requested to be kept" contained in step 1-a-1

Reserved configuration information, the function of which is to notify the second node or notify the first node (in this case, it is sent by the third node through the above second response message to the second node, and then sent by the second node to the first node) of the reserved configuration information. For the content contained in the information, please refer to the "information related to configuration keep" in the first message of the above step 1-1

Configuration information related to a backhaul link of the first node. The function of this information is to configure the backhaul link channel used by the first node on the target path. This information includes at least one of the following information: configuration information of a RLC layer, configuration information of a logical channel, etc., for which, please refer to CellGroupConfig in TS38.331

Information related to initiate user context migration. The function of this information is to inform the second node to initiate the context migration of a user served by the first node. This information includes at least one of the following information:

Indication information for initiating user context migration. The function of this information is to notify the second node to start the migration of the user context Identification information of a relay node accessed by the user, such as a BAP address of the relay node, the identification of a distributed unit portion of the relay node, etc.

Information of the number of users allowed to be accepted

Information of the number of radio bearers of users allowed to be accepted

Clock information for initiating migration, which indicates the time to wait before starting the migration Indication information for accepting user migration. The function of this information is to notify the second node whether the migration of the user context still needs to continue. This information includes at least one of the following information:

Indication information for stopping user context migration. After receiving the information, the second node will stop the migration of the user context Information of the number of users that can further be accepted. After receiving the information, the second node can select the appropriate user to perform context migration Reason information. Such as there is not enough resources, or other reasons Further, the process may also include the following steps:

Step 1-a-3: (Optional) The second node sends the first message to the first node. The function of the message is to provide the first node with the configuration information required for migration. For the content contained in the message, please refer to the first message in the above step 1-1.

Step 1-a-4: (Optional) The first node sends the first response message to the second node or the third node, and for the content contained in the message, please refer to the first response message in the above step 1-2.

The beneficial effect of the above process is that in the procedure of the migration of a relay node, the information related to the relay node can be interacted between the donor (anchor) node of the source path and the donor (anchor) node of the target path, thus the configuration information for the migration of the relay node is determined. Specifically, whether to reserve one or more configurations on the source path can be determined, the one or more reserved configurations on the source path can be determined, and one or more configurations on the target path can be determined. Another beneficial effect is that the second node and/or the third node can determine the configuration of the data transmission with the first node on the source path and/or the target path. Another beneficial effect is that after the above process, the second node and/or the third node keep the data transmission with the first node, thereby reducing the interruption or the time delay of data transmission in the procedure of migration of the relay node.

Figure 6:
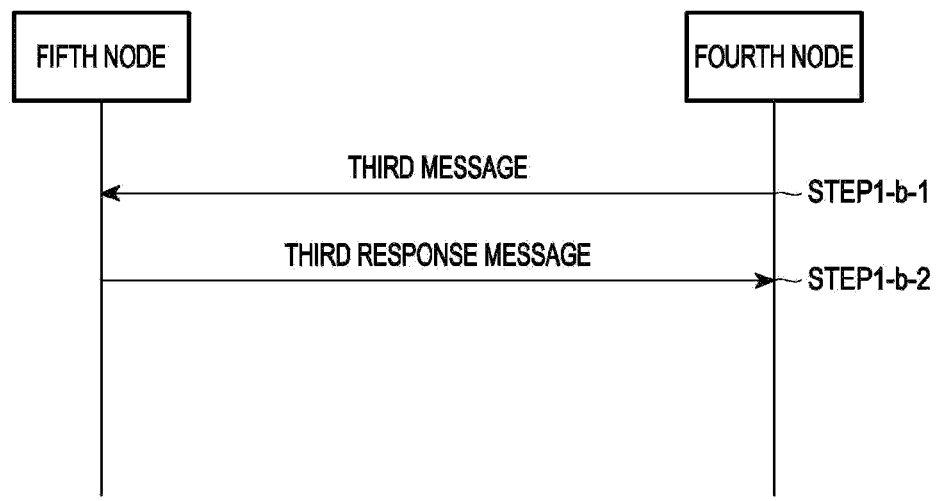
FIG. 6 shows an example of notifying the address of the first node to a distributed unit of a donor (anchor) node on the target path according to an embodiment of the present disclosure.

In addition, when the first node migrates, a possible implementation is that the second node will use the address used by the first node before the migration to perform data transmission with the first node, and the transmitted data is transmitted through the distributed unit (a fifth node) of the donor (anchor) node on the target path after the first node accesses the target path (after the random access is completed). In such implementation, the fifth node may not know the address (such as an IP address) used by the first node before the migration, so it may discard the data packet sent to or from the first node. In order to prevent this situation from happening, the present disclosure also provides an address notification mechanism. The main function of the mechanism is to notify the distributed unit of the donor (anchor) node on the target path of the address (such as the IP address) of the first node. FIG. 6 shows an example of notifying the distributed unit of the donor (anchor) node on the target path of the address of the first node according to an embodiment of the present disclosure. As shown in FIG. 6, the mechanism includes the following process:

Step 1-b-1: A fourth node sends a third message to a fifth node. The third message may be a third configuration request message, the function of which is to notify the address information used by the first node. The fourth node may be a node to which the first node is connected before the migration (such as the above-mentioned second node), or may be a node to which the first node is connected after the migration (such as the above-mentioned third node). The second node and the third node may be the same node or different nodes, and the message includes at least one of the following information:

Identification information of the first node, such as a gNB-DU ID, etc.

Address-related information, which includes at least one of the following information:

Address index information, such as an Address Index

Address information, such as an IPv4 address, an IPv6 address, an IPv6 prefix

Address information for F1-C traffic, such as an IPv4 address, an IPv6 address, an IPv6 prefix Address information for F1-U traffic, such as an IPv4 address, an IPv6 address, an IPv6 prefix Address information for non-F1 traffic, such as an IPv4 address, an IPv6 address, an IPv6 prefix Indication information of usage of an address. The usage indicated by the indication information may be one or more of the following usages: transmission of F1-C traffic, transmission of F1-U traffic, transmission of non-F1 traffic, etc.

In one embodiment, the above-mentioned address information is the address information used by the first node before the migration. The beneficial effect of receiving the information is that the fifth node can determine that the data packet containing the address information is the data packet of the first node it serves, and further, the fifth node will continue to forward the data packet without discarding the data packet.

Step 1-b-2: (Optional) The fifth node sends a third response message to the fourth node. The third response message may be a third configuration request response message, which is used for acknowledge of the message sent in step 1-b-1.

In the above description, the first message and the first response message may be RRCReconfiguration and RRCReconfigurationComplete messages respectively, or may be other RRC messages, or may be messages of the F1 interface respectively.

The second message and the second response message may be HANDOVER REQUEST and HANDOVER REQUEST ACKNOWLEDGE messages of the X2 or Xn interface respectively, or may be other messages.

The third message and the third response message may be the IAB TNL ADDRESS REQUEST and IAB TNL ADDRESS RESPONSE messages of the F1 interface respectively, or may be other messages of the F1 interface.

The respective steps in the above process (steps 1-1, 1-2, 1-3, 1-a-1, 1-a-2, 1-a-3, 1-a-4, 1-b-1, 1-b-2) can be carried out independently or in combination with each other.

The Second Aspect of the Disclosure

Figure 7:
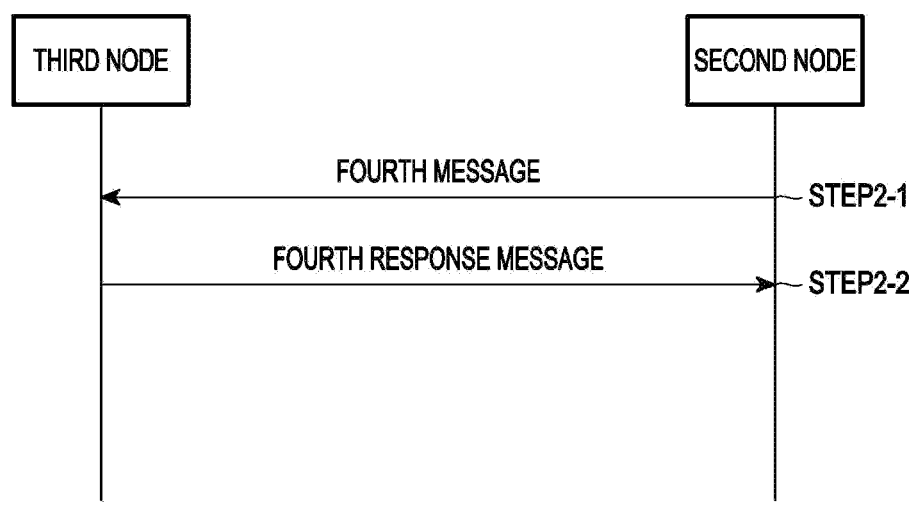
FIG. 7 shows an example of a method for user context migration according to an embodiment of the present disclosure.

In the procedure of migration of the relay node, users who access the relay node may also migrate with the relay node. When the relay node migrates from one node (source node) to another node (target node), it is necessary to migrate the context of the user who accesses the relay node to the target node too. In order to solve this problem, possible methods include group handover, that is, when the migration of the relay node is performed, the user who accesses the node is handed over to the target node by the way of the group handover. In this method, it may be limited by the message size of the X2/Xn interface, and it is impossible to perform the handover of all users in one message. Another method is to hand users over to the target node one by one in accordance with the traditional user handover method. The problem with this method is causing a lot of signaling overhead, which may result in a large handover time delay. In addition, a common problem of these two methods is that each user needs to perform handover on the air interface (the interface between the user and the relay node), which causes a large amount of air interface signaling overhead and results in a greater handover time delay. Therefore, in order to solve this problem, the present disclosure proposes a method for user context migration. FIG. 7 shows an example of the method for user context migration according to an embodiment of the present disclosure. As shown in FIG. 7, the method includes the following process:

Step 2-1: The second node sends a fourth message to the third node. The fourth message may be a first user configuration request message, and includes user configuration information. The function of the message is to transmit the user configuration information and/or send the context of the user to the third node. The message can be used to send the context of one or more users. The message includes at least one of the following information:

First information related to configuration of a user. This information may include the configuration information of one or more users. For a user, the information contained in this information can be referred to the HANDOVER REQUEST message in TS38.423 or TS36.423. In addition, it can include one or more of the above-mentioned "configuration information of user (or user context information)", and furthermore, it can also include one of the following information:

First identification information of a cell, which indicates the cell configured by the second node to the user before the migration (that is, when the user accesses the second node). The message may include one or more cells, and the cell may be a special cell (SpCell), a primary cell (PCell), a primary secondary cell (PSCell), and a secondary cell (SCell). For a cell, the information includes at least one of the following information:

A cell global identifier, a NR CGI/NCGI (a NR cell global identifier)

A physical cell identifier (PCI)

Base station identification information (such as a Global NG-RAN Node ID, or gNB ID)

First configuration information related to user data. The function of this information is to inform the transmission status of the radio bearer of the user at the second node. For a radio bearer of a user, this information includes at least one of the following information:

Identification information of the radio bearer

Transmission status information of uplink data, which includes at least one of the following information:

Indication information of receiving status of a data packet of a uplink PDCP layer (such as a PDCP SDU). This information indicates the data packet of the uplink PDCP layer received correctly and/or the data packet of the PDCP layer not received correctly at the second node. In one embodiment, the information may be a bit string (a bitmap), in which the first bit indicates the first PDCP SDU not received correctly, and the subsequent bits indicate the receiving status of respective PDCP SDUs following the PDCP SDU in turn (for example, 1 means received correctly, and 0 means not received correctly)

A sequence number of the first PDCP SDU not received correctly (a PDCP-SN)

A Hyper Frame Number of the first PDCP SDU not received correctly (a Hyper Frame Number)

Transmission status information of downlink data, which includes at least one of the following information:

A PDCP sequence number required for the first PDCP SDU that has not been allocated a PDCP sequence number A Hyper Frame Number required for the first PDCP SDU that has not been allocated a PDCP sequence number In the above information, the PDCP sequence number can be 12 bits long or 18 bits long.

Further, the above-mentioned "first information related to configuration of a user" may also be for multiple users.

Indication information of usage of the message. The function of this information is to inform the third node of the usage of the fourth message containing the indication information. The information includes at least one of the following information:

Indication information of user context migration. The function of this information is to inform the third node that the above fourth message containing the indication information is used to migrate the user context (that is, to migrate from the second node to the third node). An example of the name of the information is Context Migration Indication, and can also be other names Indication information of non-handover, the function of which is to inform the third node that the above fourth message containing the indication information is not used for handover. An example of the name of the information is No Handover Indication, and can also be other names Indication information for ignoring information. The function of this information is to inform the third node that if the above fourth message contains the indication information, the third node can ignore some of the information in the above fourth message, such as the target cell global identification (Target Cell Global ID); an example of the name of the information is Ignore Handover IEs Indication, and can also be other names Cause information, which indicates reason for sending the above fourth message, such as context migration, IAB/relay node migration, Base station change, donor node change, etc.

The beneficial effect of the indication information of usage of the message is to help the third node to determine how to understand the information in the fourth message, and to help the third node to determine how to set the information in a fourth response message. In an embodiment, the third node may ignore one or more IEs contained in the fourth message, such as the Target Cell Global ID. At the same time, when replying to the fourth response message in step 2-2, the third node will also set the information in the response message according to this information, such as does not set the configuration information of the random access of the user, does not contain the RRC container information related to handover, and so on. In addition, if the second node contains the indication information, after receiving the fourth response message in step 2-2, the second node will also determine how to process the information in the response message according to the indication information, such as to ignore some information in the message (such as the RRC container information).

Information related to migration. The function of this information is to help the third node to determine whether the migration is completed. The information includes at least one of the following information:

Indication information of the completion of migration, which indicates that the context of all users on the second node has been migrated. After receiving the indication information, the third node can consider that the second node will no longer send the fourth message to migrate the user's context Indication information of the number of users that have not yet been migrated, which indicates the number of users whose context still needs to continue to be migrated Step 2-2: The third node sends the fourth response message to the second node. The fourth response message may be a first user configuration request response message. The function of this message is to notify the configuration of user at the third node. The message can contain the configuration of one or more users. The message includes at least one of the following information:

Second information related to configuration of a user. This information can include the configuration information of one or more users. For a user, this information contains the user configuration decided by the third node. For the content contained in this information, please refer to the HANDOVER REQUEST ACKNOWLEDGE message in TS38.423 or TS36.423. In addition, it can also include one or more of the information included in the above-mentioned "configuration information of user (or user context information)", and furthermore, it can also include one of the following information:

Second identification information of a cell. The cell identified by this information is the cell serving the user. The cell serving the user is the cell of the third node. In one embodiment, the migration of the user context is because the relay node accessed by the user migrates (migrates from the second node to the third node), which leads to the cell served by the relay node to change (for example, the cell identification changes). The information may include the identifications of one or more cells. The cell may be a SpCell, a PCell, a PSCell and a SCell. For a cell, the information includes at least one of the following information:

A cell global identifier, a NR CGI/NCGI (a NR cell global identifier)

A PCI

Base station identification information (such as a Global NG-RAN Node ID, or a gNB ID)

Indication information for reserving configuration information of a radio bearer of a user. The function of this information is to notify the second node to reserve the configuration information of the radio bearer of the user to continue serving the user. For a radio bearer of a user, this information includes at least one of the following information:

Identification information of the radio bearer

Indication information for reserving a uplink tunnel of the radio bearer of the user. This information informs the second node that it can also receive the user data on the uplink tunnel of the radio bearer Indication information for reserving a downlink tunnel of the radio bearer of the user. The information informs the second node that it can also send the user data to the relay node on the downlink tunnel of the radio bearer. Further, it can also include the information added to the data packet by the second node when sending the user data to the relay node, such as the setting value of the DSCP field and/or the setting value of the Flow Label field. The function of this information is to help the second node to set fields in the data packet so as to ensure data packet sent by it can finally be sent to the relay node The above-mentioned "second information related to configuration of a user" may also be for multiple users.

Indication information of user migration. The function of this information is to notify the second node whether the migration of the user context still needs to continue. This information includes at least one of the following information:

Indication information for stopping user context migration. After receiving the information, the second node will stop the migration of the user context Information of the number of users that can further be accepted. After receiving the information, the second node can select the appropriate user to perform context migration Cause information. Such as there is not enough resources, or other reasons Indication information for ignoring information. The function of this information is to notify the second node to ignore some of information in the above fourth response message, such as the RRC container contained in the message. An embodiment is to ignore the Target NG-RAN node To Source NG-RAN node Transparent Container IE in the message.

The above process is different from the user handover process in the traditional technology (that is, the handover preparation process carried out by the HANDOVER REQUEST and HANDOVER REQUEST ACKNOWLEDGE messages on the X2/Xn interface), because the user does not switch the serving cell in the procedure (it is still the cell on the relay node), so in step 2-1, there is no need to contain the information related to the target cell (such as the identification information of the target cell which is a cell of the third node, and, in one embodiment, is the cell after the relay node has migrated to the third node), or configuration information related to random access. However, some new information will further need to be contained, such as the configuration information related to the tunnel of the radio bearer of the user, and the information related to the backhaul link required by the tunnel serving the radio bearer of the user. For details, please refer to the above "configuration information of user (or user context information)". Therefore, the fourth message and the fourth response message in the above process can be newly defined messages on the Xn/X2 interface. The message can be a user-related message (only one user's context is migrated at a time). Examples of the message name can be respectively UE Context Migration Request/Response, Group Context Migration Request/Response, etc.

In another embodiment, the fourth message and the fourth response message in the above process may also be existing messages, such as HANDOVER REQUEST and HANDOVER REQUEST ACKNOWLEDGE messages on the X2/Xn interface. However, as described above, the migration of the user context is different from the handover of the user, and thus, some IEs in the existing HANDOVER REQUEST message may not be needed, or the third node can ignore some IEs in the message. Therefore, it is necessary to add indication information in the HANDOVER REQUEST message to indicate that sending the message does not aim at handover, or to indicate that sending the message aims at the migration of the user context. An example of the added indication information is the "indication information of usage of the message" contained in the above step 2-1. After receiving the indication information, the third node will not understand the process as a handover process, but as a context migration process, and then, the third node may have some behaviors distinguished from the handover preparation process, such as ignoring certain IEs. After receiving the indication information, the third node may also be different from the existing handover preparation process when setting the HANDOVER REQUEST ACKNOWLEDGE message, for example, the third node may not modify the configuration information of the user, the third node may not configure the configuration related to random access or the like for the user, and the third node may add the "indication information for ignoring information" to the message to notify the second node to ignore some information in the message.

In another embodiment, the fourth message and the fourth response message in the above process may also be existing messages, such as HANDOVER REQUEST and HANDOVER REQUEST ACKNOWLEDGE messages on the X2/Xn interface, and the above process is equivalent to the existing handover preparation process of the user and is different from the existing process in that some new information is added to the HANDOVER REQUEST and HANDOVER REQUEST ACKNOWLEDGE messages. These new information can be used to interact the context information of the user between the second node and the third node. Further, after step 2-2, there may also be included that the second node or the third node sends an RRCReconfiguration message to a user accessing the first node (the user is the user targeted by the HANDOVER REQUEST and HANDOVER REQUEST ACKNOWLEDGE messages), and that the user accessing the first node sends an RRCReconfigurationComplete message to the second node or the third node.

In another embodiment, the fourth message and the fourth response message in the above process can also be non-user-related messages (the context of one or more users is migrated at a time), and then the process can be used to migrate the context of multiple users at a time. Examples of the message name may be respectively Group Context Migration Request/Response, etc.

The beneficial effect of the above process is that the user's context can be migrated from one node to another node. Further, in the procedure of migration, there may be no need to perform configuration update on the user, or there may be a need to perform configuration update on the user. Another beneficial effect is that in the procedure of migration of the relay node, it is avoided that the migration of the user's context and the handover of the mobile terminal portion of the relay node are carried out together, thereby saving the signaling overhead, reducing the time delay of the transmission of the user data, and avoiding the interruption of the transmission of the user data.

Figure 8:
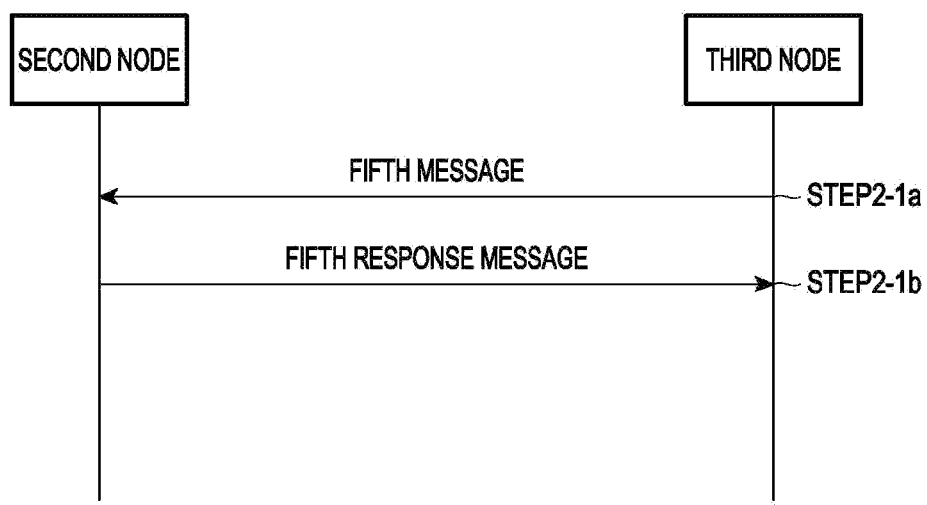
FIG. 8 shows an example of a process that may be further included before step 2-1 of FIG. 7 according to an embodiment of the present disclosure.

In addition to the above process, optionally, FIG. 8 shows an example of a process that can further be included before step 2-1 in FIG. 7 according to an embodiment of the present disclosure, as shown in FIG. 8:

Step 2-1a: The third node sends a fifth message to the second node. The fifth message may be a second user configuration request message. The function of the message is to notify the second node to start the migration of the user context. The message includes at least one of the following information:

Indication information for initiating user context migration. The function of this information is to notify the second node to start the migration of the user context Identification information of a relay node accessed by the user, such as the BAP address of the relay node, the identification of the distributed unit portion of the relay node, etc.

Information of the number of users allowed to be accepted

Information of the number of radio bearers of users allowed to be accepted

Clock information for initiating migration, which indicates the time to wait before starting the migration Step 2-1b: (Optional) The second node sends a fifth response message to the third node. The fifth response message may be a second user configuration request response message. The function of this message is to acknowledge the receipt of the fifth message in the above step 2-1a.

In another embodiment, the above step 2-1a may also occur in the procedure of user context migration, and then the function of sending the fifth message is to notify the second node of information related to user context migration. Thus, the above-mentioned fifth message sent may also include at least one of the following information:

Indication information of user migration. The function of this information is to notify the second node whether the migration of the user context still needs to continue. This information includes at least one of the following information:

Indication information for stopping user context migration. After receiving the information, the second node will stop the migration of the user context Information of the number of users that can further be accepted. After receiving the information, the second node can select the appropriate user to perform context migration Reason information. Such as there is not enough resources, or other reasons The fifth message and the fifth response message in the above process may be newly defined messages of the X2/Xn interface, or may be existing messages. The messages may be non-user-related messages or user-related messages. An example of the message names may be UE Context Migration Trigger Request/Response messages, or other messages. In another embodiment, step 2-1b may not be included in the above process.

The beneficial effect of the above process is that the third node can notify the second node to perform migration of the user context according to the access situation of the relay node, which can ensure the success of the migration.

Figure 9:
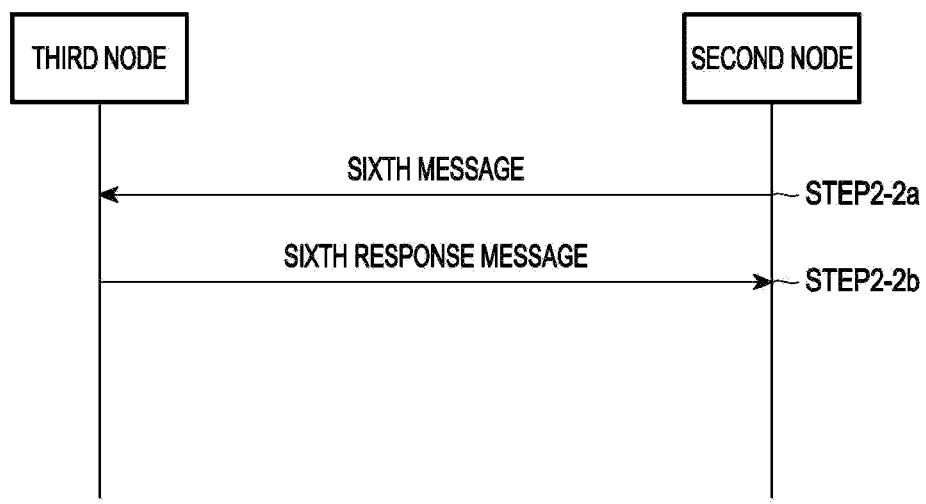
FIG. 9 shows an example of a process that may be further included after step 2-2 of FIG. 7 according to an embodiment of the present disclosure.

In addition, FIG. 9 shows an example of a process that may further be included after the above step 2-2 in FIG. 7 according to an embodiment of the present disclosure, as shown in FIG. 9:

Step 2-2a: The second node sends a sixth message to the third node. The sixth message can be a third user configuration request message. The function of this message is to notify the third node that the migration of the user context has been completed. The message includes at least one of the following information:

Indication information of completion of user context migration

Second configuration information related to user data. The function of this information is to inform the transmission status of the radio bearer of the user at the second node. For a radio bearer of a user, this information includes at least one of the following information:

Identification information of the radio bearer

Transmission status information of uplink data, which includes at least one of the following information:

Indication information of receiving status of a data packet of a uplink PDCP layer (such as a PDCP SDU). This information indicates the data packet of the uplink PDCP layer received correctly and/or the data packet of the PDCP layer not received correctly at the second node. In one embodiment, the information may be a bit string (a bitmap), in which the first bit indicates the first PDCP SDU not received correctly, and the subsequent bits indicate the receiving status of respective PDCP SDUs following the PDCP SDU in turn (for example, 1 means received correctly, and 0 means not received correctly)

A sequence number of the first PDCP SDU not received correctly (a PDCP-SN)

A hyper frame number of the first PDCP SDU not received correctly (a hyper frame number)

Transmission status information of downlink data, which includes at least one of the following information:

A PDCP sequence number required for the first PDCP SDU that has not been allocated a PDCP sequence number A Hyper Frame Number required for the first PDCP SDU that has not been allocated a PDCP sequence number In the above information, the PDCP sequence number can be 12 bits long or 18 bits long.

Step 2-2b: (Optional) The third node sends a sixth response message to the second node. The sixth response message may be a third user configuration request response message. The function of this message is to acknowledge the receipt of the sixth message in the above step 2-2a.

The sixth message and the sixth response message in the above process may be newly defined messages of the X2/Xn interface, or may be existing messages. The messages may be non-user-associated messages or user-associated messages. An example of the message names may be UE Context Migration Complete Request/Response messages, or other messages. In another embodiment, step 2-2b may not be included in the above process.

The beneficial effect of the above process is that the second node can notify the third node that the migration of the user context has been completed, and help the third node to determine to release the information in the source node serving the user.

Figure 10:
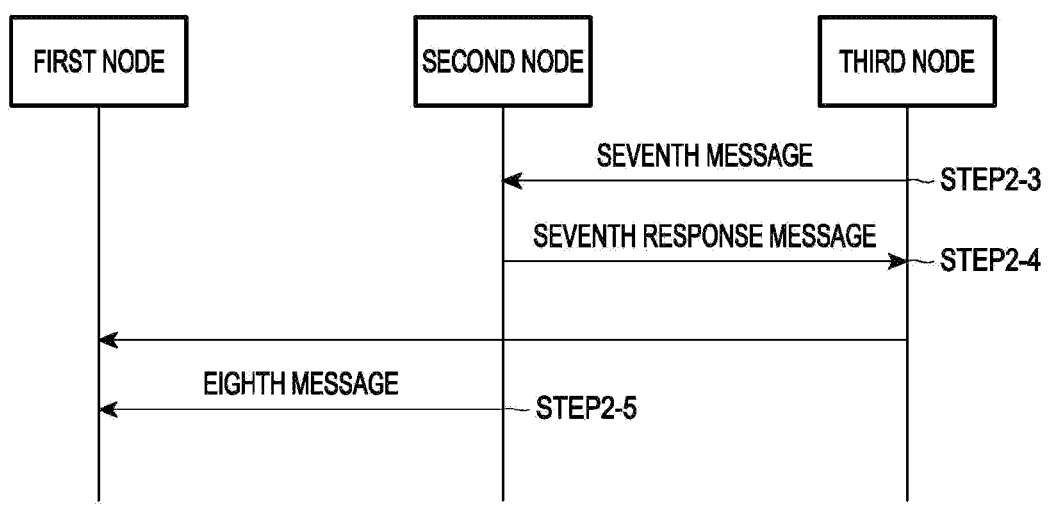
FIG. 10 shows an example of a process that may be included after the migration of the user context is completed according to an embodiment of the present disclosure.

In addition, FIG. 10 shows an example of a process that may further be included after the migration of the user context is completed according to an embodiment of the present disclosure, as shown in FIG. 10:

Step 2-3: The third node sends a seventh message to the second node. The seventh message may be a fourth user configuration request message. The function of this message is to notify the second node to release configuration related to the user and/or the relay node. The message includes at least one of the following information:

Identification information of the relay node, such as a gNB-ID, a BAP address, etc.

Indication information for releasing user context

Indication information for releasing context of the relay node

Indication information for releasing configuration of a source path

After receiving the above message, the second node can release the configuration related to serving the relay node, and can also release the configuration related to the user accessing the relay node.

Optionally, a step 2-4 is further included: the second node sends a seventh response message to the third node. The seventh response message may be a fourth user configuration request response message, and the function of the message is to acknowledge the receipt of the seventh message mentioned above. Further, the message may also include at least one of the following information:
Third configuration information related to user data. The function of this information is to inform transmission status of a radio bearer of a user at the second node. For a radio bearer of a user, this information includes at least one of the following information:
Identification information of the radio bearer
Transmission status information of uplink data, which includes at least one of the following information:
Indication information of receiving status of a data packet of a uplink PDCP layer (such as a PDCP SDU). This information indicates the data packet of the uplink PDCP layer received correctly and/or the data packet of the PDCP layer not received correctly at the second node. In one embodiment, the information may be a bit string (such as a bitmap), in which the first bit indicates the first PDCP SDU not received correctly, and the subsequent bits indicate the receiving status of respective PDCP SDUs following the PDCP SDU in turn (for example, 1 means received correctly, and 0 means not received correctly)
A sequence number of the first PDCP SDU not received correctly (a PDCP-SN)
A Hyper Frame Number of the first PDCP SDU not received correctly (a Hyper Frame Number)
Transmission status information of downlink data, which includes at least one of the following information:
A PDCP sequence number required for the first PDCP SDU that has not been allocated a PDCP sequence number
A hyper frame number required for the first PDCP SDU that has not been allocated a PDCP sequence number The seventh message and the seventh response message in the above process may be newly defined messages of the X2/Xn interface, or may be existing messages. The messages may be non-user-associated messages or user-associated messages. Examples of the message names can be Migration Success Request/Response messages, or Source Path Release Request/Response messages, or can be other messages.

Optionally, a step 2-5 may be further included: the second node or the third node sends an eighth message to the first node. The eighth message may be a fifth user configuration request message, and the message is used to notify the first node to release the configuration information related to the user and/or the relay node. The message includes at least one of the following information:
Identification information of the relay node, such as a gNB-ID, a BAP address, etc.
Indication information for releasing user context
Indication information for releasing context of the relay node
Indication information for releasing configuration of a source path
The step 2-5 can be performed independently or after the above step 2-3 or step 2-4.

The beneficial effect of the above process is that the third node can notify the second node to release the context of the relay node and/or the user, as well as related configuration and resources on the source path, thus facilitating the second node to provide more resources for other users. Another beneficial effect is that the second node or the third node can notify the first node to release the context of the relay node and/or the user, as well as the related configuration and resources on the source path, thus facilitating the first node to provide more resources for other users.

Respective steps in the above processes (steps 2-1, 2-2, 2-1a, 2-1b, 2-2a, 2-2b, 2-3, 2-4, 2-5) can be performed independently or in combination. In one embodiment, the following steps may be included:
Step 1: The third node sends the fifth message to the second node; see step 2-1 a above
Step 2: (Optional) The second node sends the fifth response message to the third node; see step 2-1b above
Step 3: The second node sends the fourth message to the third node; see step 2-1 above
Step 4: The third node sends the fourth response message to the second node; see step 2-2 above
The above steps 3/4 can be performed continuously to migrate context of a user.
Step 5: The second node sends the sixth message to the third node; see step 2-2a above
Step 6: (Optional) The third node sends the sixth response message to the second node; see step 2-2b above
Step 7: The third node sends the seventh message to the second node; see step 2-3 above
Step 8: Optionally, the second node sends the seventh response message to the third node; see step 2-4 above
Step 9: Optionally, the second node or the third node sends the eighth message to the first node; see step 2-5 above The process of the first aspect and the process of the second aspect of the present disclosure may also be combined with each other. In an embodiment, the following processes may be included:
Step 1: The second node sends the second message to the third node; see step 1-a-1 above
Step 2: The third node sends the second response message to the second node; see step 1-a-2 above
Step 3: The fourth node sends the first message to the first node; see step 1-1 above
Step 4: (Optional) The first node sends the first response message to the fourth node; see step 1-2 above
Step 5: The third node sends the fifth message to the second node; see step 2-1 a above
Step 6: (Optional) The second node sends the fifth response message to the third node; see step 2-1b above
Step 7: The second node sends the fourth message to the third node; see step 2-1 above
Step 8: The third node sends the fourth response message to the second node; see step 2-2 above
The above steps 7/8 can be performed continuously to migrate context of a user.
Step 9: The second node sends the sixth message to the third node; see step 2-2a above
Step 10: (Optional) The third node sends the sixth response message to the second node; see step 2-2b above
Step 11: The third node sends the seventh message to the second node; see step 2-3 above
Step 12: (Optional) The second node sends the seventh response message to the third node; see step 2-4 above
Step 13: (Optional) The second node or the third node sends the eighth message to the first node; see step 2-5 above

1) The Effects of the Disclosure

Figure 11:
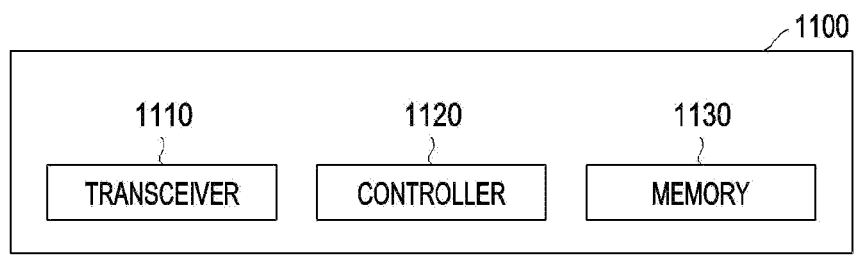
FIG. 11 is a block diagram of a donor (anchor) node according to an embodiment of the present disclosure.

Based on the disclosure content of the first aspect, the beneficial effects are as follows:
1) In the procedure of migration (or the procedure of configuration update), the relay node can keep communication with the source path (or the path where it is before the configuration is updated), thereby avoiding or reducing the interruption and the time delay of user data transmission 2) After the migration (after the configuration is updated), the relay node can send the data of a user through the target path used after the migration (after the configuration is updated), thereby avoiding or reducing the interruption and the time delay of user data transmission Based on the disclosure content of the second aspect, the beneficial effects are as follows:

1) The context of a user can be migrated between base stations without requiring the user to perform handover, which saves the signaling overhead and reduces the handover time delay 2) In a multi-hop relay network, configuration and resources of the source path can be released in time, and wireless resources on the node are effectively used FIG. 11 is a block diagram of a donor (anchor) node according to an embodiment of the present disclosure. Here, a donor (anchor) node is taken as an example to illustrate its structure and function, but it should be understood that the structure and function shown can also be applied to a base station or a distributed unit of the donor (anchor) node, etc.

Referring to FIG. 11, the donor (anchor) node 1100 includes a transceiver 1110, a controller 1120 and a memory 1130. Under the control of the controller 1120 (which can be implemented as one or more processors), the donor (anchor) node 1100 (including the transceiver 1110 and the memory 1130) is configured to perform operations of the donor (anchor) node in the processes shown in FIG. 3, FIG. 5 to FIG. 10 or as described above, including, but not limited to, operations of the source donor (anchor) node and target donor (anchor) node. Although the transceiver 1110, the controller 1120 and the memory 1130 are shown as separate entities, they may be implemented as a single entity, such as a single chip. The transceiver 1110, the controller 1120 and the memory 1130 may be electrically connected or coupled to each other. The transceiver 1110 may send signals to and receive signals from other network entities which are for example another donor (anchor) node, a relay node, and/or a UE or the like. In an implementation, the transceiver 1110 may be omitted. In this case, the controller 1120 may be configured to execute instructions (including computer programs) stored in the memory 1130 to control the overall operation of the donor (anchor) node 1100, thereby implementing operations of the donor (anchor) node in the processes shown in FIG. 3, FIG. 5 to FIG. 10 or as described above.

Figure 12:
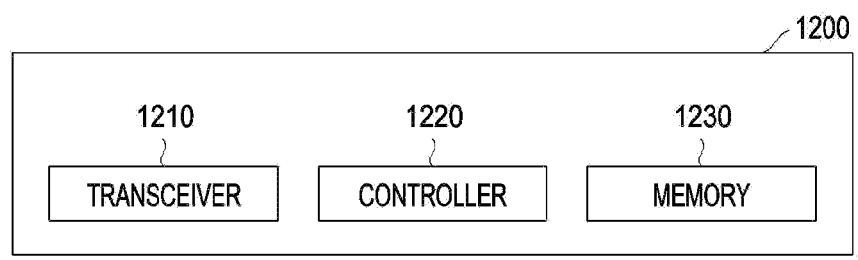
FIG. 12 is a block diagram of a relay node according to an embodiment of the present disclosure.

FIG. 12 is a block diagram of a relay node according to an embodiment of the present disclosure.

Referring to FIG. 12, the relay node 1200 includes a transceiver 1210, a controller 1220 and a memory 1230. Under the control of the controller 1220 (which can be implemented as one or more processors), the relay node 1200 (including the transceiver 1210 and the memory 1230) is configured to perform operations of the relay node in the processes shown in FIG. 3 and FIG. 5 or as described above. Although the transceiver 1210, the controller 1220 and the memory 1230 are shown as separate entities, they may be implemented as a single entity, such as a single chip. The transceiver 1210, the controller 1220 and the memory 1230 may be electrically connected or coupled to each other. The transceiver 1210 may send signals to and receive signals from other network entities which are for example a donor (anchor) node, another relay node, and/or a UE or the like. In an implementation, the transceiver 1210 may be omitted. In this case, the controller 1220 may be configured to execute instructions (including computer programs) stored in the memory 1230 to control the overall operation of the relay node 1200, so as to perform operations of the relay node in the processes shown in FIG. 3 and FIG. 5 or as described above.

According to various embodiments, a method executed by a first node in a communication system is provided. The method may comprise: receiving a first message from a fourth node, the first message including information for configuring the first node to perform migration; and performing data transmission according to the received first message.

According to various embodiments, the first message may include at least one of the following information: information related to a backhaul link, information related to an address, and information related to configuration keep.

According to various embodiments, A method executed by a fourth node in a communication system is provided. The method may comprise: acquiring information for configuring a first node to perform migration; and sending a first message to the first node, the first message including the information for configuring the first node to perform migration.

According to various embodiments, the first message may include at least one of the following information: information related to a backhaul link, information related to an address, and information related to configuration keep.

According to various embodiments, the method may further comprise: sending a third message to a fifth node, the third message including at least one of the following information: identification information of the first node and address-related information.

According to various embodiments, A method executed by a second node in a communication system is provided. The method may comprise: sending a second message to a third node, the second message including requesting information for configuring a first node to migrate; and receiving a second response message from the third node, the second response message including information for configuring the first node to migrate.

According to various embodiments, the second message may include at least one of the following information: configuration information of the first node, request information related to an address of the first node, information related to a backhaul link of the first node, indication information for requesting to keep configuration, and information related to a load of the first node.

According to various embodiments, the second response message may include at least one of the following information: feedback information related to an address of the first node, response information for keeping configuration, configuration information related to a backhaul link of the first node, information related to initiating user context migration, and indication information for accepting user migration.

According to various embodiments, a method executed by a third node in a communication system is provided. The method may comprise: receiving a second message from a second node, the second message including requesting information for configuring a first node to migrate; and sending a second response message to the second node, the second response message including the information for configuring the first node to migrate.

According to various embodiments, the second message may include at least one of the following information: configuration information of the first node, request information related to an address of the first node, information related to a backhaul link of the first node, indication information for requesting to keep configuration, and information related to a load of the first node.

According to various embodiments, the second response message may include at least one of the following information: feedback information related to an address of the first node, response information for keeping configuration, configuration information related to a backhaul link of the first node, information related to initiating user context migration, and indication information for accepting user migration.

According to various embodiments, a method executed by a second node in a communication system is provided. The method may comprise sending a fourth message to a third node, the fourth message including user configuration information; and receiving a fourth response message from the third node.

According to various embodiments, the fourth message may include at least one of the following information: first information related to configuration of a user, indication information of usage of the message, and information related to migration.

According to various embodiments, the fourth response message may include at least one of the following information: second information related to configuration of a user, indication information of user migration, and indication information for ignoring information.

According to various embodiments, the method may further comprise: sending a sixth message to the third node, the sixth message including at least one of the following information: indication information of completion of user context migration and second configuration information related to user data.

According to various embodiments, the method may further comprise: sending an eighth message to a first node, the eighth message including at least one of the following information: identification information of a relay node, indication information for releasing user context, indication information for releasing context of the relay node, and indication information for releasing configuration of a source path.

According to various embodiments, a method executed by a third node in a communication system is provided. The method may comprise: receiving a fourth message from a second node, the fourth message including user configuration information; and sending a fourth response message to the second node.

According to various embodiments, the fourth message may include at least one of the following information: first information related to configuration of a user, indication information of usage of the message, and information related to migration.

According to various embodiments, the fourth response message may include at least one of the following information: second information related to configuration of a user, indication information of user migration, and indication information for ignoring information.

According to various embodiments, the method may further comprise: sending a fifth message to the second node, the fifth message including at least one of the following information: indication information for initiating user context migration, identification information of a relay node accessed by a user, information of the number of users allowed to be accepted, information of the number of radio bearers of users allowed to be accepted, clock information for initiating migration, and indication information of user migration.

According to various embodiments, the method may further comprise: sending a seventh message to the second node, the seventh message including at least one of the following information: identification information of a relay node, indication information for releasing user context, indication information for releasing context of the relay node, and indication information for releasing configuration of a source path.

According to various embodiments, the method may further comprise: sending an eighth message to a first node, the eighth message including at least one of the following information: identification information of a relay node, indication information for releasing user context, indication information for releasing context of the relay node, and indication information for releasing configuration of a source path.

According to various embodiments, a method performed by a source integrated access and backhaul (IAB)-central unit (CU) in a communication system is provided. The method may comprise: sending, to a target IAB-CU, a request message including information for requesting to configure a relay node to migrate; and receiving, from the target IAB-CU, a response message including information for configuring the relay node to migrate.

According to various embodiments, the request message may include at least one of: configuration information of the relay node, information related to an address of the relay node, information related to a backhaul link of the relay node, information for requesting to keep configuration, or information related to a load of the relay node.

According to various embodiments, the response message may include at least one of: feedback information related to an address of the relay node, information for keeping configuration, information related to initiation of user context migration, or information related to an internet protocol (IP) packet.

According to various embodiments, a method performed by a target integrated access and backhaul (IAB)-central unit (CU) in a communication system is provided. The method may comprise: receiving, from a source IAB-CU, a request message including information for requesting to configure a relay node to migrate; and sending, to the source IAB-CU, a response message including information for configuring the relay to migrate.

According to various embodiments, the request message may include at least one of: configuration information of the relay node, information related to an address of the relay node, information related to a backhaul link of the relay node, information for requesting to keep configuration, or information related to a load of the relay node.

According to various embodiments, the response message may include at least one of: feedback information related to an address of the relay node, information for keeping configuration, information related to initiation of user context migration, or information related to an internet protocol (IP) packet.

According to various embodiments, a method performed by a source integrated access and backhaul (IAB)-central unit (CU) in a communication system is provided. The method may comprise: sending, to a target IAB-CU, a request message including user configuration information; and receiving, from the target IAB-CU, a response message to the request message.

According to various embodiments, the request message may include at least one of: information indicating to ignore at least part of information included in the request message, information indicating completion of migration, or information indicating a number of users that have not yet been migrated.

According to various embodiments, the response message may include at least one of: information for identifying a cell, information for stopping user context migration, or information indicating a number of users which are to be further accepted.

According to various embodiments, the method may further comprise: sending, to the target IAB-CU, another response message including information indicating completion of user context migration.

According to various embodiments, a method performed by a target integrated access and backhaul (IAB)-central unit (CU) in a communication system is provided. The method may comprise: receiving, from a source IAB-CU, a request message including user configuration information; and sending, to the source IAB-CU, a response message to the request message.

According to various embodiments, the request message may include at least one of: information indicating to ignore at least part of information included in the request message, information indicating completion of migration, or information indicating a number of users that have not yet been migrated.

According to various embodiments, the response message may include at least one of: information for identifying a cell, information for stopping user context migration, or information indicating a number of users which are to be further accepted.

According to various embodiments, the method may further comprise: sending, to the source IAB-CU, another request message including information for initiating user context migration.

According to various embodiments, a source integrated access and backhaul (IAB)-central unit (CU) in a communication system is provided. The source IAB-CU may comprise: a transceiver; and at least one processor configured to: send, to a target IAB-CU via the transceiver, a request message including information for requesting to configure a relay node to migrate, and receive, from the target IAB-CU via the transceiver, a response message including information for configuring the relay node to migrate.

According to various embodiments, a target integrated access and backhaul (IAB)-central unit (CU) in a communication system is provided. The target IAB-CU may comprise: a transceiver; and at least one processor configured to: receive, from a source IAB-CU via the transceiver, a request message including information for requesting to configure a relay node to migrate, and send, to the source IAB-CU via the transceiver, a response message including information for configuring the relay to migrate.

According to various embodiments, a source integrated access and backhaul (IAB)-central unit (CU) in a communication system is provided. The source IAB-CU may comprise: a transceiver; and at least one processor configured to: send, to a target IAB-CU, a request message including user configuration information, and receive, from the target IAB-CU, a response message to the request message.

According to various embodiments, a target integrated access and backhaul (IAB)-central unit (CU) in a communication system is provided. The target IAB-CU may comprise: a transceiver; and at least one processor configured to: receive, from a source IAB-CU, a request message including user configuration information, and send, to the source IAB-CU, a response message to the request message.

Those skilled in the art may realize that the present disclosure can be implemented in other specific forms without changing the technical idea or basic features of the present disclosure. Therefore, it should be understood that the above-mentioned embodiments are merely examples and not limitative. The scope of the present disclosure is defined by the appended claims rather than the detailed description. Therefore, it should be understood that all modifications or variations derived from the meaning and scope of the appended claims and their equivalents fall within the scope of the present disclosure.

In the above-mentioned embodiments of the present disclosure, all operations and messages may be selectively performed or may be omitted. In addition, the operations in each embodiment do not need to be performed sequentially, and the order of the operations can be changed. Messages do not need to be delivered in order, and the delivery order of messages may vary. Each operation and each message delivery can be performed independently.

Although the present disclosure has been shown and described with reference to various embodiments of the present disclosure, those skilled in the art will understand that various changes can be made in form and details without departing from the spirit and scope of the present disclosure as defined by the appended claims and their equivalents.

The invention claimed is:

1. A method performed by a first integrated access and backhaul (IAB) donor in a wireless communication system, the method comprising:
   transmitting, to a second IAB donor, a request message including first information related to a first address assigned to an integrated access and backhaul IAB) node and address request information indicating a request of address assignment; and
   receiving, from the second IAB donor, a response message in response to the request message,
   wherein second information related to a second address configured to the IAB node is included in the response message based on the address request information.

2. The method of claim 1, wherein the first address assigned to the IAB node includes at least one of an internet protocol (IP) version 4 (IPv4) address assigned to the IAB node or an IP version 6 (IPv6) address assigned to the IAB node.

3. The method of claim 1, wherein the address request information includes at least one of a request of internet protocol (IP) version 4 (IPv4) address assignment or a request of IP version 6 (IPv6) address assignment.

4. The method of claim 1, wherein the address request information includes at least one of information related to a number of requested addresses for all traffic, information related to a number of requested addresses for F1-C traffic, information related to a number of requested addresses for F1-U traffic, or information related to a number of requested addresses for non-F1 traffic.

5. The method of claim 1, wherein the second information includes at least one of an internet protocol (IP) version 4 (IPv4) address assigned to the IAB node, an IP version 6 (IPv6) address assigned to the IAB node, information indicating usage of the IPv4 address or the IPv6 address, or an address of an IAB-donor-distributed unit (DU).

6. A method performed by a second integrated access and backhaul (IAB) donor in a wireless communication system, the method comprising:

receiving, from a first IAB donor, a request message including first information related to a first address assigned to an integrated access and backhaul (IAB) node and address request information indicating a request of address assignment; and transmitting, to the first IAB donor, a response message in response to the request message, wherein second information related to a second address configured to the IAB node is included in the response message based on the address request information.

7. The method of claim 6, wherein the first address assigned to the IAB node includes at least one of an internet protocol (IP) version 4 (IPv4) address assigned to the IAB node or an IP version 6 (IPv6) address assigned to the IAB node.

8. The method of claim 6, wherein the address request information includes at least one of a request of internet protocol (IP) version 4 (IPv4) address assignment or a request of IP version 6 (IPv6) address assignment.

9. The method of claim 6, wherein the address request information includes at least one of information related to a number of requested addresses for all traffic, information related to a number of requested addresses for F1-C traffic, information related to a number of requested addresses for F1-U traffic, or information related to a number of requested addresses for non-F1 traffic.

10. The method of claim 6, wherein the second information includes at least one of an internet protocol (IP) version 4 (IPv4) address assigned to the IAB node, an IP version 6 (IPv6) address assigned to the IAB node, information indicating usage of the IPv4 address or the IPv6 address, or an address of an IAB-donor-distributed unit (DU).

11. A first integrated access and backhaul (IAB) donor in a wireless communication system, the first IAB donor comprising:

a transceiver; and at least one processor coupled to the transceiver, and configured to:

transmit, to a second IAB donor, a request message including first information related to a first address assigned to an integrated access and backhaul (IAB) node and address request information indicating a request of address assignment, and receive, from the second IAB donor, a response message in response to the request message, wherein second information related to a second address configured to the IAB node is included in the response message based on the address request information.

12. The first IAB donor of claim 11, wherein the first address assigned to the IAB node includes at least one of an internet protocol (IP) version 4 (IPv4) address assigned to the IAB node or an IP version 6 (IPv6) address assigned to the IAB node.

13. The first IAB donor of claim 11, wherein the address request information includes at least one of a request of internet protocol (IP) version 4 (IPv4) address assignment or a request of IP version 6 (IPv6) address assignment.

14. The first IAB donor of claim 11, wherein the address request information includes at least one of information related to a number of requested addresses for all traffic, information related to a number of requested addresses for F1-C traffic, information related to a number of requested addresses for F1-U traffic, or information related to a number of requested addresses for non-F1 traffic.

15. The first IAB donor of claim 11, wherein the second information includes at least one of an internet protocol (IP) version 4 (IPv4) address assigned to the IAB node, an IP version 6 (IPv6) address assigned to the IAB node, information indicating usage of the IPv4 address or the IPv6 address, or an address of an IAB-donor-distributed unit (DU).

16. A second integrated access and backhaul (IAB) donor in a wireless communication system, the second IAB donor comprising:

a transceiver; and at least one processor coupled to the transceiver, and configured to:

receive, from a first IAB donor, a request message including first information related to a first address assigned to an integrated access and backhaul IAB) node and address request information indicating a request of address assignment, and transmit, to the first IAB donor, a response message in response to the request message, wherein second information related to a second address configured to the IAB node is included in the response message based on the address request information.

17. The second IAB donor of claim 16, wherein the first address assigned to the IAB node includes at least one of an internet protocol (IP) version 4 (IPv4) address assigned to the IAB node or an IP version 6 (IPv6) address assigned to the IAB node.

18. The second IAB donor of claim 16, wherein the address request information includes at least one of a request of internet protocol (IP) version 4 (IPv4) address assignment or a request of IP version 6 (IPv6) address assignment.

19. The second IAB donor of claim 16, wherein the address request information includes at least one of information related to a number of requested addresses for all traffic, information related to a number of requested addresses for F1-C traffic, information related to a number of requested addresses for F1-U traffic, or information related to a number of requested addresses for non-F1 traffic.

20. The second IAB donor of claim 16, wherein the second information includes at least one of an internet protocol (IP) version 4 (IPv4) address assigned to the IAB node, an IP version 6 (IPv6) address assigned to the IAB node, information indicating usage of the IPv4 address or the IPv6 address, or an address of an IAB-donor-distributed unit (DU).

* * * * *